US011226784B2

(12) United States Patent
Kim et al.

(10) Patent No.: US 11,226,784 B2
(45) Date of Patent: Jan. 18, 2022

(54) ELECTRONIC DEVICE COMPRISING PLURALITY OF DISPLAYS AND METHOD FOR OPERATING SAME

(71) Applicant: Samsung Electronics Co., Ltd., Suwon-si (KR)

(72) Inventors: Joon-Hwan Kim, Yongin-si (KR); Sun-Hee Moon, Hwaseong-si (KR); John Lee, Gunpo-si (KR); Won-Sik Lee, Seongnam-si (KR); Hyun-Yeul Lee, Seoul (KR); Seung-Yeon Chung, Seoul (KR); Hye-Min Ha, Suwon-si (KR); Kyung-Wha Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 15/773,883

(22) PCT Filed: Nov. 1, 2016

(86) PCT No.: PCT/KR2016/012444
§ 371 (c)(1),
(2) Date: May 4, 2018

(87) PCT Pub. No.: WO2017/078366
PCT Pub. Date: May 11, 2017

(65) Prior Publication Data
US 2018/0321892 A1 Nov. 8, 2018

(30) Foreign Application Priority Data
Nov. 6, 2015 (KR) .................... 10-2015-0156127

(51) Int. Cl.
*G06F 3/0488* (2013.01)
*G06F 3/14* (2006.01)
(Continued)

(52) U.S. Cl.
CPC .......... *G06F 3/1423* (2013.01); *G06F 1/1601* (2013.01); *G06F 1/1618* (2013.01);
(Continued)

(58) Field of Classification Search
CPC ..... G06F 3/0489; G06F 3/0488; G06F 3/0487
See application file for complete search history.

(56) References Cited

U.S. PATENT DOCUMENTS 8,738,101 B1 * 5/2014 Myr ...................... G06F 1/1616
455/575.1
10,805,574 B2 * 10/2020 Tsukahara ............. G06F 1/1694
(Continued)

FOREIGN PATENT DOCUMENTS

CN 102150098 A 8/2011
CN 102656808 A 9/2012
(Continued)

OTHER PUBLICATIONS

European Search Report dated Aug. 31, 2018, issued in European Application No. 16862382.5.
(Continued)

*Primary Examiner* — Phenuel S Salomon
(74) *Attorney, Agent, or Firm* — Jefferson IP Law, LLP

(57) ABSTRACT

A method for operating an electronic device, comprising a plurality of displays, which includes a first body unit, a second body unit, a first display which is disposed on the other side of the first body unit and faces a first direction, a second display which is disposed on the other side of the second body unit and faces a second direction, and a processor configured to display on the first display a screen of a first application and, when the angle between the first body unit and the second body unit is smaller than a predetermined angle, display on the second display at least one of an image related to the first application, an image
(Continued)

related to first content being executed by means of the first application and an image related to information obtained by means of the electronic device.

20 Claims, 26 Drawing Sheets

(51) Int. Cl.
G06F 3/01 (2006.01)
H04M 1/02 (2006.01)
G06F 3/0487 (2013.01)
G06F 3/0346 (2013.01)
G06F 1/16 (2006.01)
G06F 3/0489 (2013.01)
G06F 3/16 (2006.01)

(52) U.S. Cl.
CPC .......... G06F 1/1647 (2013.01); G06F 1/1677 (2013.01); G06F 1/1681 (2013.01); G06F 3/017 (2013.01); G06F 3/0346 (2013.01); G06F 3/0487 (2013.01); H04M 1/0214 (2013.01); H04M 1/0243 (2013.01); H04M 1/0245 (2013.01); G06F 3/0488 (2013.01); G06F 3/0489 (2013.01); G06F 3/167 (2013.01); G06F 2203/04803 (2013.01); H04M 2250/12 (2013.01); H04M 2250/16 (2013.01); H04M 2250/22 (2013.01)

(56) References Cited

U.S. PATENT DOCUMENTS

| | | | | |
|---|---|---|---|---|
| 2007/0164923 A1* | 7/2007 | Kanai | ............... | G06F 1/1683 345/1.1 |
| 2008/0309640 A1* | 12/2008 | Hong | ............... | G06F 1/1624 345/173 |
| 2010/0064244 A1* | 3/2010 | Kilpatrick, II | ........ | G06F 1/1649 715/773 |
| 2010/0064536 A1* | 3/2010 | Caskey | ............... | G06F 1/1677 33/303 |
| 2010/0188344 A1* | 7/2010 | Shirakawa | .......... | G06F 3/04815 345/173 |
| 2010/0302179 A1* | 12/2010 | Ahn | ............... | G06F 1/1618 345/173 |
| 2011/0143769 A1 | 6/2011 | Jones et al. | | |
| 2011/0148739 A1* | 6/2011 | Nurmi | ............... | G06F 1/1649 345/1.3 |
| 2011/0191710 A1* | 8/2011 | Jang | ............... | G06F 15/025 715/776 |
| 2011/0193806 A1* | 8/2011 | Kim | ............... | G06F 1/1641 345/173 |
| 2011/0211042 A1* | 9/2011 | Thorpe | ............... | H04N 13/239 348/43 |
| 2011/0216064 A1* | 9/2011 | Dahl | ............... | G06F 1/1677 345/428 |
| 2012/0026069 A1* | 2/2012 | Ohsaki | ............... | G06F 3/0481 345/1.2 |
| 2012/0026554 A1* | 2/2012 | Genda | ............... | H04N 1/4055 358/3.27 |
| 2012/0081277 A1* | 4/2012 | de Paz | ............... | G06F 3/04845 345/156 |
| 2012/0147430 A1* | 6/2012 | Kashibuchi | ............ | H04N 1/405 358/3.27 |
| 2012/0274541 A1* | 11/2012 | Inami | ............... | G06F 1/1641 345/1.3 |
| 2013/0012273 A1* | 1/2013 | Sato | ............... | G06F 1/1624 455/566 |
| 2013/0076597 A1* | 3/2013 | Becze | ............... | G09G 5/12 345/1.3 |
| 2013/0077236 A1* | 3/2013 | Becze | ............... | G06F 3/0487 361/679.56 |
| 2013/0082960 A1* | 4/2013 | Otake | ............... | G03G 15/5087 345/173 |
| 2013/0169545 A1* | 7/2013 | Eaton | ............... | G06F 1/1647 345/173 |
| 2013/0249873 A1* | 9/2013 | Zhang | ............... | G06F 3/0488 345/204 |
| 2013/0321264 A1* | 12/2013 | Park | ............... | G06F 3/01 345/156 |
| 2013/0321340 A1* | 12/2013 | Seo | ............... | G06F 3/04817 345/174 |
| 2014/0078372 A1* | 3/2014 | Yamashita | ........ | G06K 9/00228 348/333.02 |
| 2014/0101535 A1 | 4/2014 | Kim et al. | | |
| 2014/0132486 A1* | 5/2014 | Wei | ............... | G09G 3/3611 345/31 |
| 2014/0340840 A1* | 11/2014 | Han | ............... | G06F 1/182 361/679.43 |
| 2015/0002436 A1* | 1/2015 | Yano | ............... | G06F 3/0416 345/173 |
| 2015/0189021 A1* | 7/2015 | Yang | ............... | H04L 67/38 348/14.07 |
| 2015/0227225 A1* | 8/2015 | Park | ............... | G06F 1/1641 345/173 |
| 2017/0023972 A1* | 1/2017 | Xin | ............... | G06F 1/1652 |
| 2018/0095499 A1* | 4/2018 | Sirpal | ............... | G06F 1/1641 |
| 2018/0211382 A1* | 7/2018 | Igarashi | ............... | G06T 7/136 |
| 2019/0361489 A1* | 11/2019 | Wei | ............... | G06F 1/1677 |

FOREIGN PATENT DOCUMENTS

| | | |
|---|---|---|
| CN | 103455138 A | 12/2013 |
| CN | 103729158 A | 4/2014 |
| EP | 2 611 117 A1 | 7/2013 |
| EP | 2 720 141 A1 | 4/2014 |
| WO | 2011/084298 A2 | 7/2011 |

OTHER PUBLICATIONS

Chinese Office Action with English translation dated Aug. 5, 2020; Chinese Appln. No. 201680064846.9.

* cited by examiner

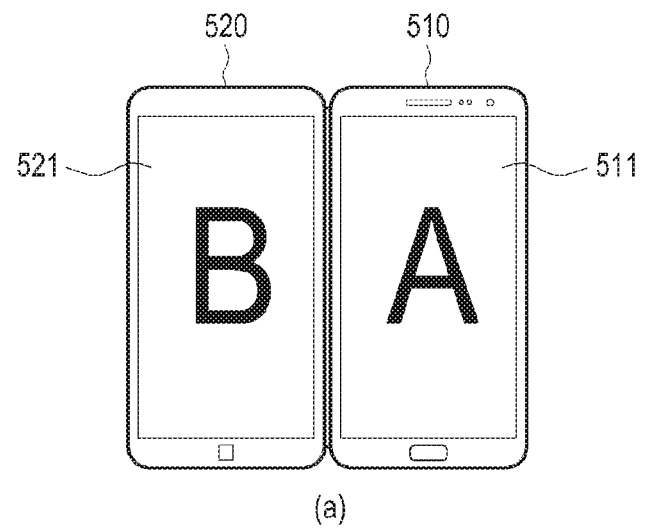
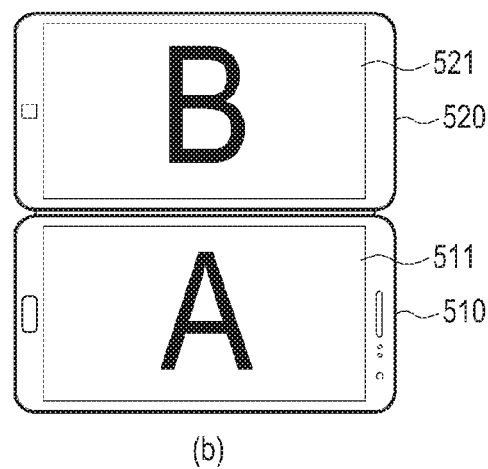
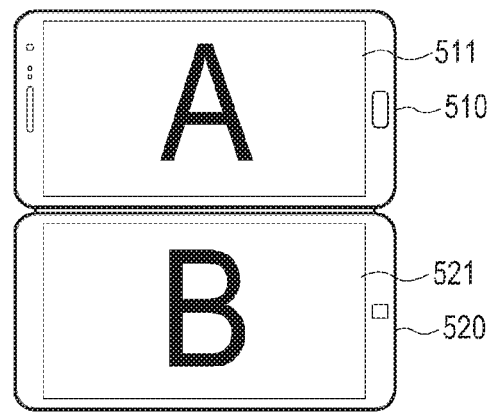
FIG.5C

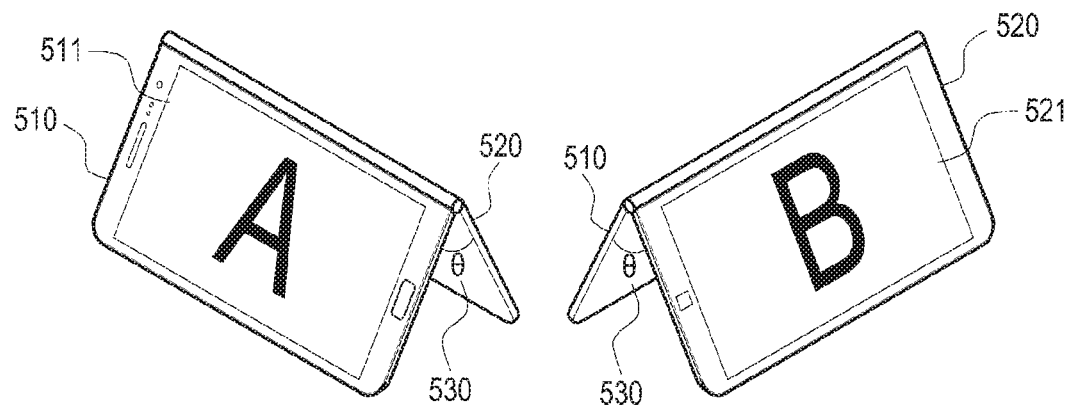
(a)
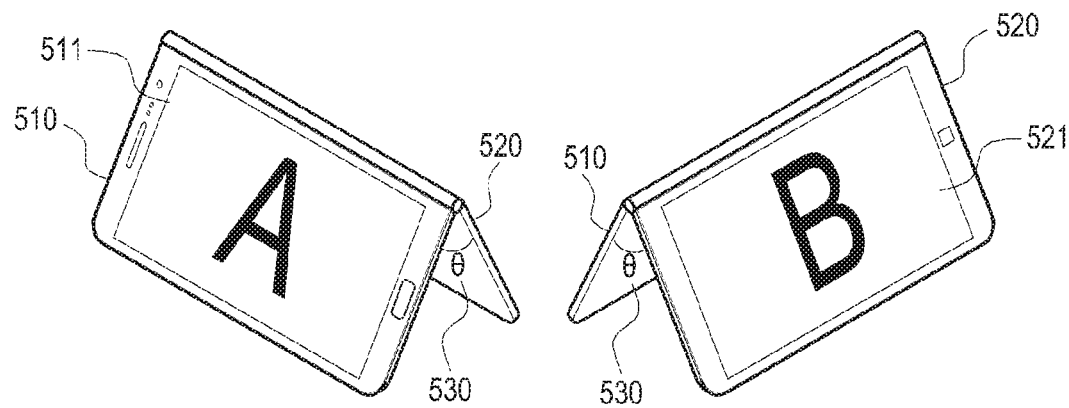
(b)
FIG.5D

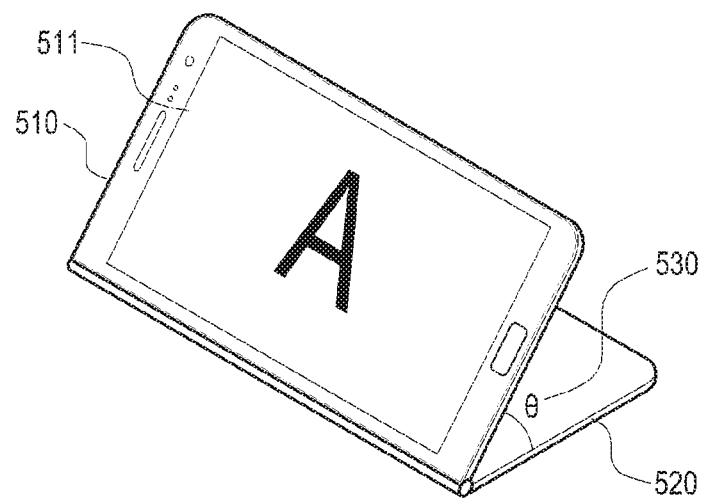
(a)
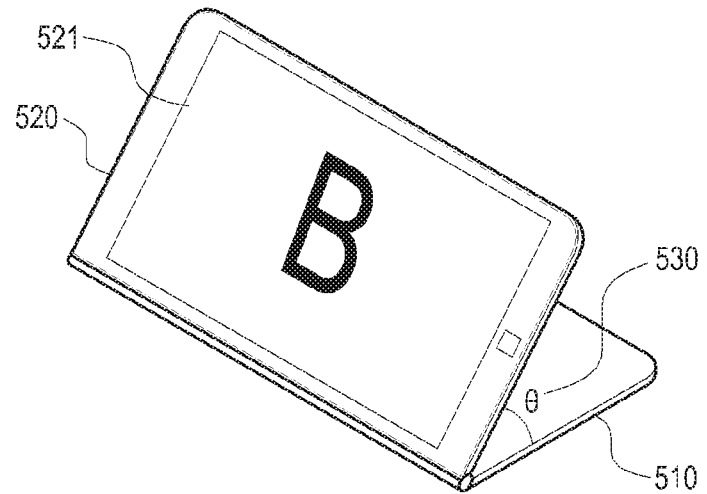
(b)
FIG.5E

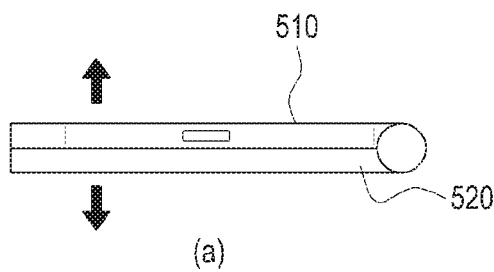
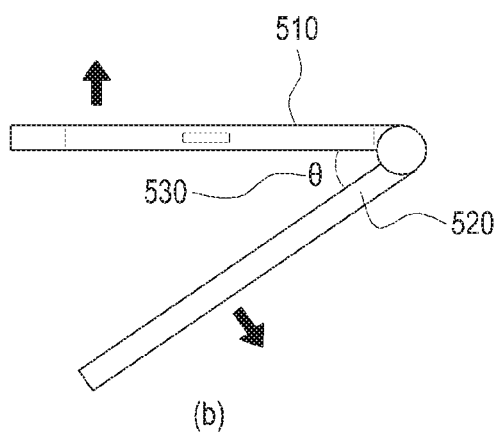
FIG.6A
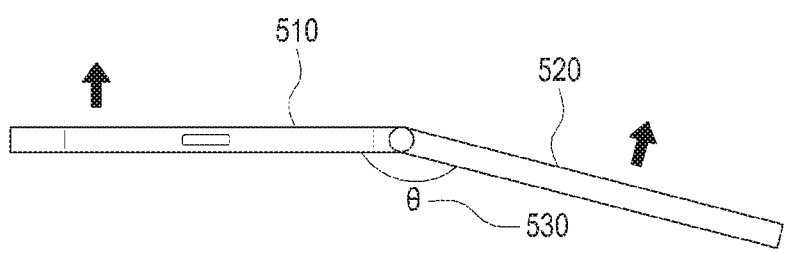
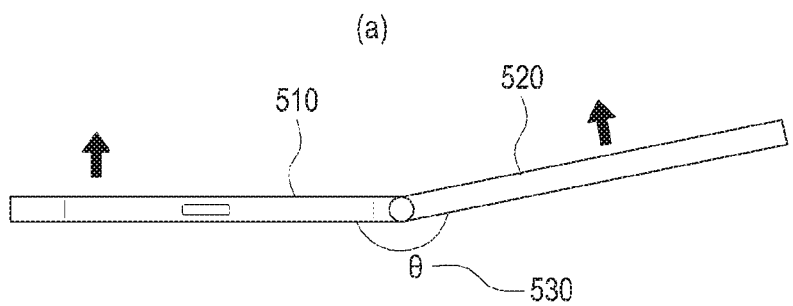
FIG.6B

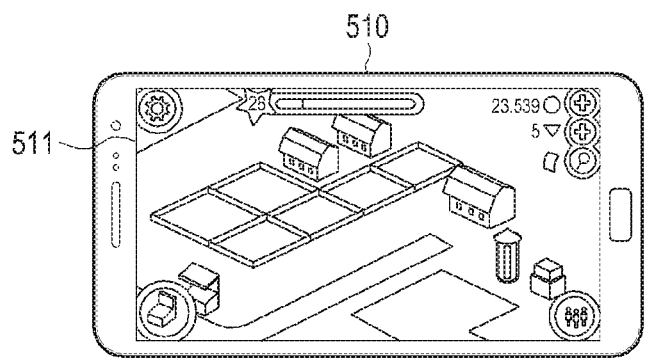
(a)
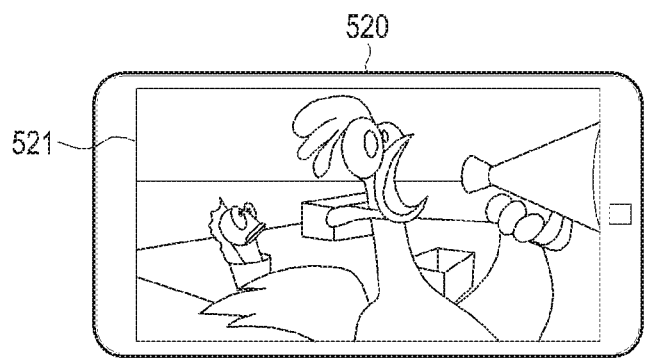
(b)
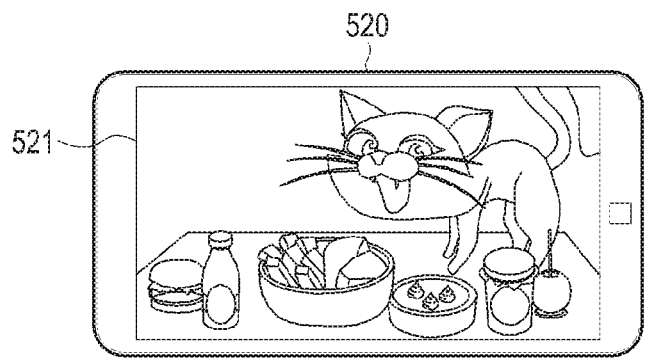
(c)
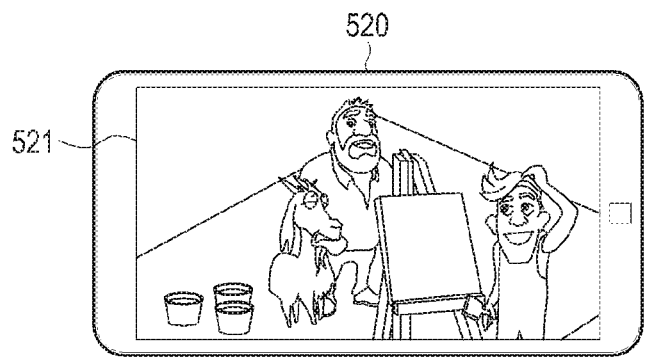
(d)
FIG.9E

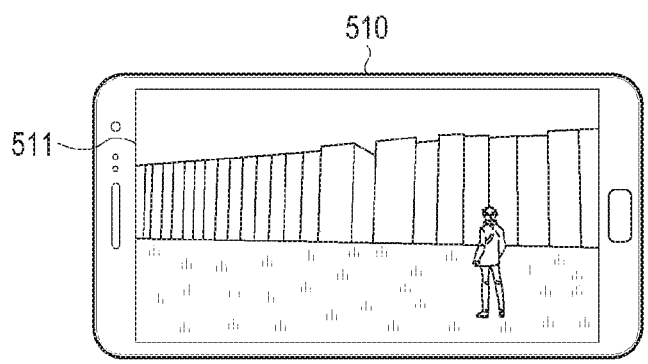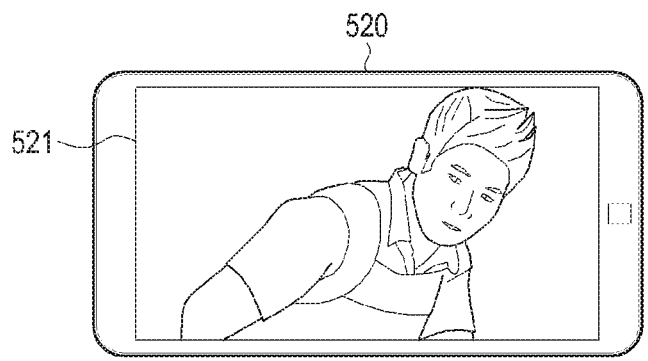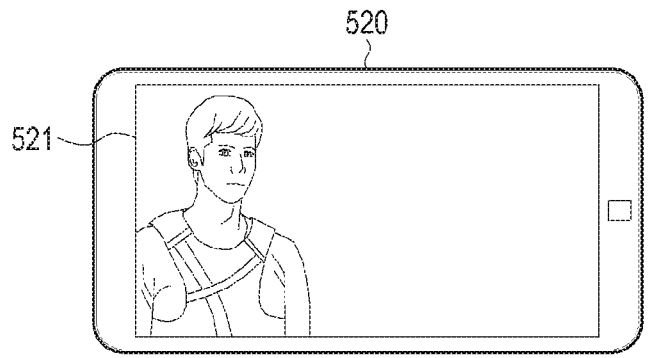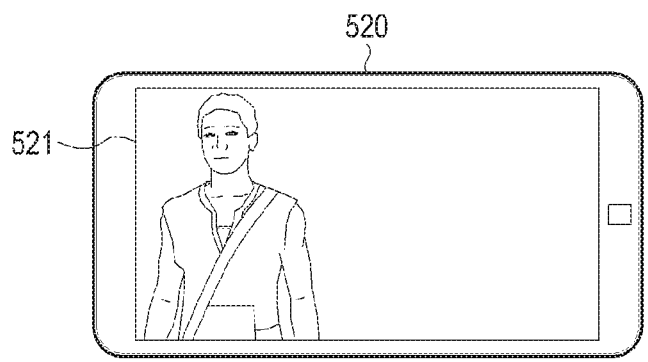
FIG.9F

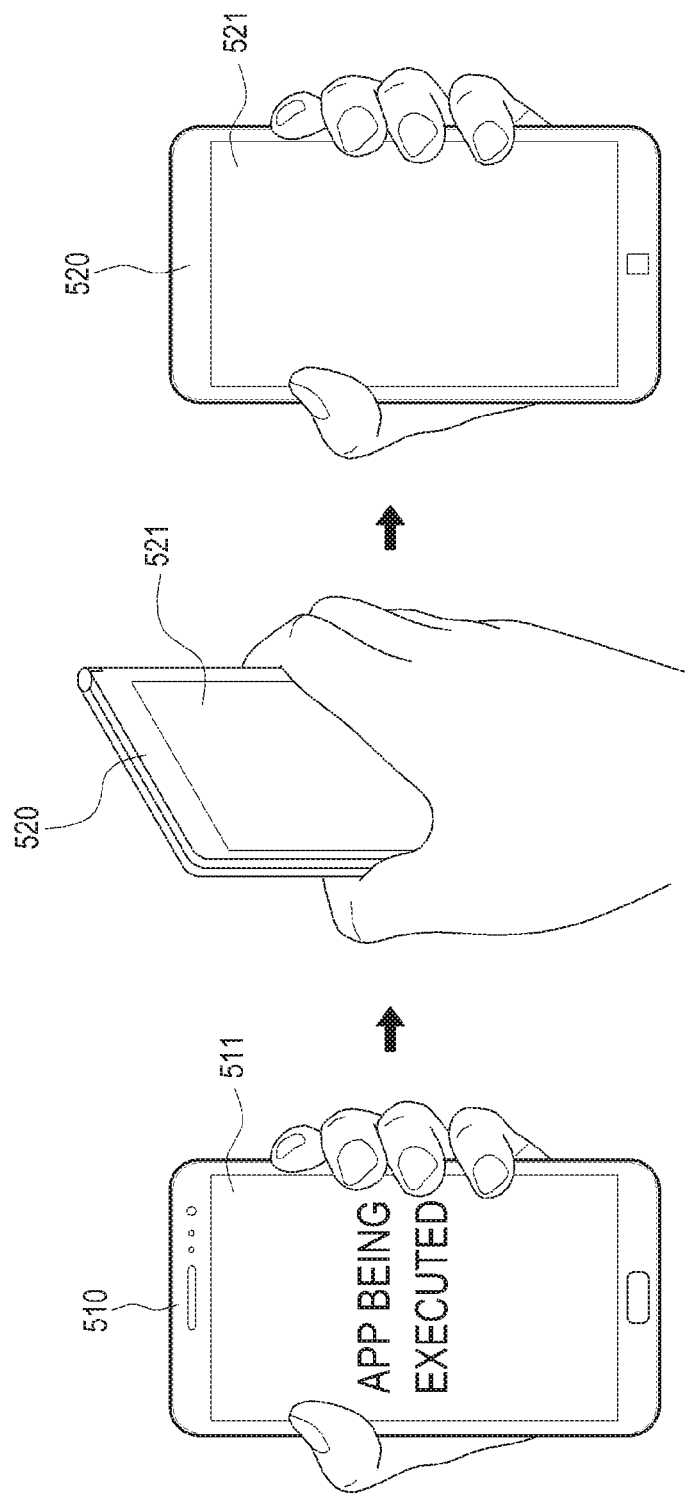

ELECTRONIC DEVICE COMPRISING PLURALITY OF DISPLAYS AND METHOD FOR OPERATING SAME

CROSS-REFERENCE TO RELATED APPLICATION(S)

This application is a U.S. National Stage application under 35 U.S.C. § 371 of an International application number PCT/KR2016/012444, filed on Nov. 1, 2016, which is based on and claimed priority of a Korean patent application number 10-2015-0156127, filed on Nov. 6, 2015, in the Korean Intellectual Property Office, the disclosure of which is incorporated by reference herein in its entirety.

TECHNICAL FIELD

The present disclosure relates to an electronic device including a plurality of displays and an operation method of the electronic device, and more particularly, to an electronic device which displays various screens on a plurality of displays, respectively, and an operation method of the electronic device.

BACKGROUND ART

Electronic devices are capable of displaying various information and contents on displays thereof and receiving various inputs through the displays. In this way, the display of the electronic device functions as an input means that receive an input as well as a display means that displays a screen.

Recently, a larger-size and higher-definition display has been employed, and to further improve design aspects or utilization of the electronic device, various forms of displays have been employed in the electronic device.

Moreover, as the portability of the electronic device has been emphasized in recent times, users are able to use the electronic device in various locations and places, such that the electronic device has been developed in various forms that make it more convenient for the user to use the electronic device.

DETAILED DESCRIPTION OF THE INVENTION

Technical Problem

With the diversification of roles of the electronic device based on the increasing utilization of the electronic device, a plurality of displays are needed in the electronic device to provide a convenient use environment to the user.

The electronic device, which includes the plurality of displays, displays an execution screen of an application, content, and so forth on the plurality of displays, respectively, and thus, when operating in the same manner as an electronic device including a single display, may not take advantage of the plurality of displays.

Unlike the electronic device including the single display, the electronic device including the plurality of displays need to control the plurality of displays to display a screen appropriate for a form or an intention in which the user uses the electronic device. Moreover, a form in which the plurality of displays are arranged in the electronic device also needs to be considered for control of the plurality of displays.

Technical Solution

According to various embodiments of the present disclosure, an electronic device includes a first body portion, a second body portion hinge-coupled with the first body portion, such that one surface thereof contacts one surface of the first body portion, a first display arranged on the other surface of the first body portion and oriented in a first direction, a second display arranged on the other surface of the second body portion and oriented in a second direction, and a processor configured to display a screen of a first application on the first display and to display at least one of an image associated with the first application, an image associated with first content executed through the first application, or an image associated with information obtained through the electronic device on the second display at a preset angle or less between the first body portion and the second body portion.

According to various embodiments of the present disclosure, an operation method of an electronic device that includes a first body portion, a second body portion hinge-coupled with the first body portion, such that one surface thereof contacts one surface of the first body portion, a first display arranged on the other surface of the first body portion and oriented in a first direction, and a second display arranged on the other surface of the second body portion and oriented in a second direction, includes displaying a screen of a first application on the first display and displaying at least one of an image associated with the first application, an image associated with first content executed through the first application, or an image associated with information obtained through the electronic device on the second display at a preset angle or less between the first body portion and the second body portion.

Advantageous Effects

According to various embodiments of the present disclosure, the electronic device may display on a second display, an image or information associated with a screen displayed on a first display. Moreover, the electronic device may change a screen displayed on a plurality of displays as the direction of the electronic device is changed like when the electronic device is flipped or the like, thereby providing a screen that meets a user's intention. As such, the electronic device according to various embodiments of the present disclosure may efficiently use each of the plurality of displays. Furthermore, by providing a screen that fits for the user according to motion of the electronic device made by the user, user convenient may be improved.

BRIEF DESCRIPTION OF DRAWINGS

FIGS. 5A through 5E illustrate various operating types of an electronic device according to various embodiments of the present disclosure.

FIGS. 6A through 6D are views for describing various operation modes with respect to an angle between a first body portion and a second body portion according to various embodiments of the present disclosure.

FIGS. 9A through 9G illustrate a screen displayed on each of a plurality of displays by an electronic device according to various embodiments of the present disclosure.

FIGS. 10A through 10C illustrate various views for describing a process of changing a direction in which a display included in an electronic device is oriented, according to various embodiments of the present disclosure.

MODE FOR CARRYING OUT THE INVENTION

Figure 1:
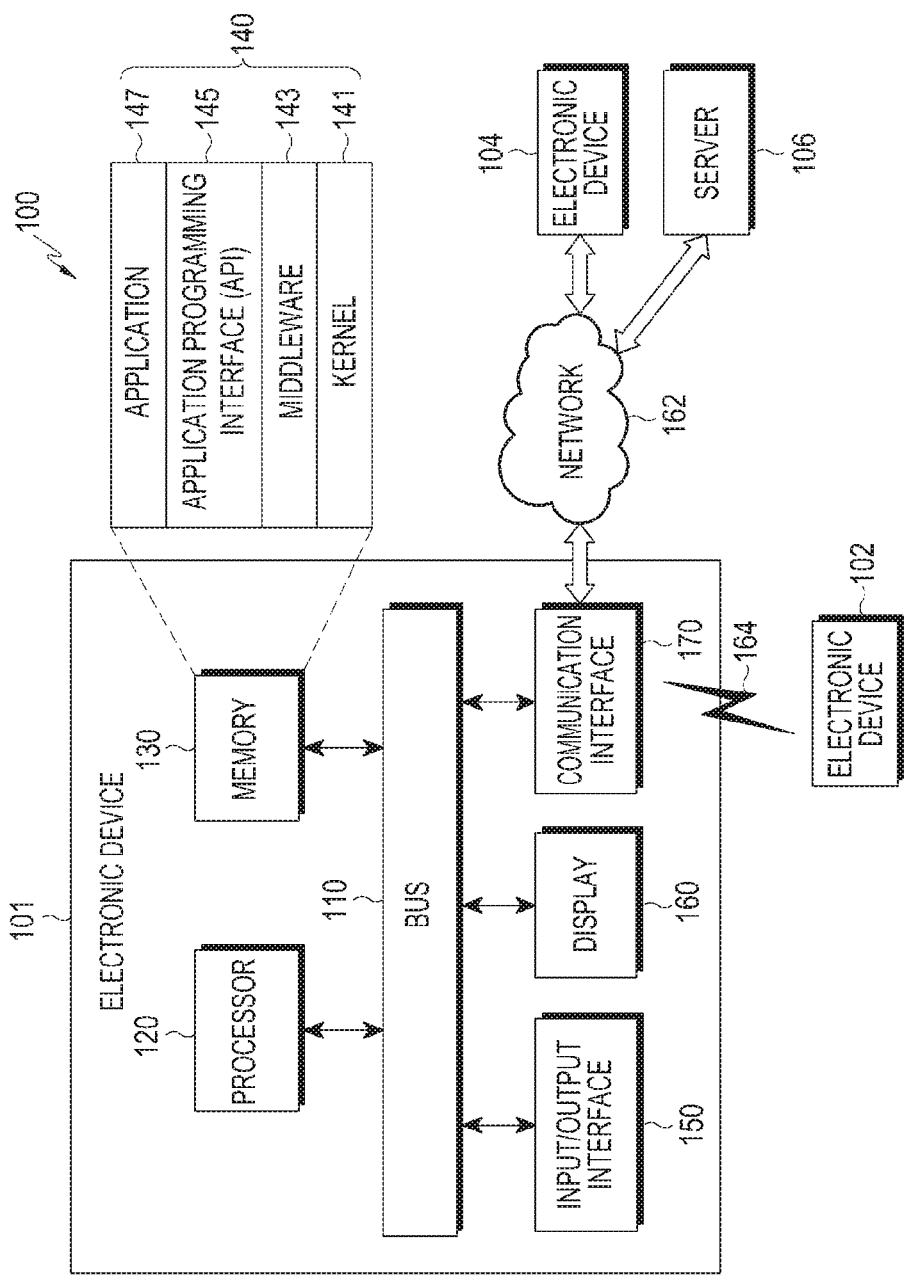
FIG. 1 illustrates a network environment including an electronic device according to various embodiments of the present disclosure.

Hereinafter, various embodiments of the present disclosure will be disclosed with reference to the accompanying drawings. However, it should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

In the present disclosure, an expression such as "having," "may have," "comprising," or "may comprise" indicates existence of a corresponding characteristic (e.g., a numerical value, a function, an operation, or an element like a part) and does not exclude existence of additional characteristic.

As used herein, each of such phrases as "A or B," "at least one of A or/and B," "at least one or more of A or/and B," and so forth may include all possible combinations of the items enumerated together in a corresponding one of the phrases. For example, "A or B," "at least one of A and B," or "one or more of A or B" may indicate the entire of (1) including at least one A, (2) including at least one B, or (3) including both at least one A and at least one B.

As used herein, such terms as "1st" and "2nd," or "first" and "second" may be used to define various components regardless of importance or order, and simply distinguish a corresponding component from another without limiting the components. For example, a first user device and a second user device may represent different user devices regardless of order or importance. For example, a first element may be named as a second element without departing from the right scope of the various exemplary embodiments of the present disclosure, and similarly, a second element may be named as a first element.

When it is described that an element (such as a first element) is "operatively or communicatively coupled with/to" or "connected" to another element (such as a second element), the element can be directly connected to the other element or can be connected to the other element through another element (e.g., a third element). However, when it is described that an element (e.g., a first element) is "directly connected" or "directly coupled" to another element (e.g., a second element), it means that there is no intermediate element (e.g., a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory device. A term "configured to (or set)" does not always mean only "specifically designed to" by hardware.

Terms defined in the present disclosure are used for only describing a specific exemplary embodiment and may not have an intention to limit the scope of other exemplary embodiments. The singular forms are intended to include the plural forms as well, unless the context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various exemplary embodiments. In some case, terms defined in the present disclosure cannot be analyzed to exclude the present exemplary embodiments.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device. According to various embodiments, examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), and so forth.

According to some embodiments, the electronic device may be a home appliance. The home appliance may include, for example, a television (TV), a digital video disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., Samsung HomeSync™, Apple TV™, or Google TV™), a game console (e.g., Xbox™ PlayStation™, etc.), an electronic dictionary, an electronic key, a camcorder, and an electronic frame.

According to other embodiments of the present disclosure, the electronic device may include at least one of various medical equipment (for example, magnetic resonance angiography (MRA), magnetic resonance imaging (MRI), computed tomography (CT), an imaging device, or an ultrasonic device), a navigation system, a global navigation satellite system (GNSS), an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth).

According to some embodiments, the electronic device may include a part of a furniture or building/structure, an electronic board, an electronic signature receiving device, a projector, and various measuring instruments (e.g., a water, electricity, gas, electric wave measuring device, etc.). The electronic device according to various embodiments of the present disclosure may be one of the above-listed devices or a combination thereof. The electronic device according to some embodiments may be a flexible electronic device. The electronic device according to various embodiments of the present disclosure is not limited to the above-listed devices and may include new electronic devices according to technical development.

Hereinafter, an electronic device according to various embodiments of the present disclosure will be described with reference to the accompanying drawings. Herein, the term "user" used in various embodiments of the present disclosure may refer to a person who uses the electronic device or a device using the electronic device.

FIG. 1 illustrates a network environment including an electronic device according to various embodiments of the present disclosure.

Referring to FIG. 1, an electronic device 101 in a network environment 100 according to various embodiments of the present disclosure is disclosed. The electronic device 101 may include a bus 110, a processor 120, a memory 130, an input/output (I/O) interface 150, a display 160, and a communication interface 170. According to some embodiments, the electronic device 101 may omit at least one of the foregoing elements or may further include other elements.

The bus 110 may include a circuit for connecting, e.g., the elements 110 to 170 and delivering communication (e.g., a control message and/or data) between the elements 110 to 170.

The processor 120 may include one or more of a central processing unit (CPU), an application processor (AP), and a communication processor (CP). The processor 120 performs operations or data processing for control and/or communication of, for example, at least one other elements of the electronic device 101.

The memory 130 may include a volatile and/or nonvolatile memory. The memory 130 may store, for example, instructions or data associated with at least one other elements of the electronic device 101. According to an embodiment of the present disclosure, the memory 130 may store software and/or a program 140. The program 140 may include at least one of, for example, a kernel 141, middleware 143, an application programming interface (API) 145, and/or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141.

In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147. For example, the middleware 143 may perform scheduling or load balancing with respect to the one or more task requests by processing the one or more task requests based on the priority given to the at least one of the application programs 147.

The API 145 is an interface used for the application 147 to control a function provided by the kernel 141 or the middleware 143, and may include, for example, at least one interface or function (e.g., a command) for file control, window control, image processing or character control.

The I/O interface 150 serves as an interface for delivering, for example, a command or data input from a user or another external device to other component(s) of the electronic device 101. The I/O interface 150 may also output a command or data received from other component(s) of the electronic device 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display. The display 160 may, for example, display various contents (e.g., a text, an image, video, an icon, a symbol, etc.) to users. The display 160 may include a touch screen, and receives a touch, a gesture, proximity, or a hovering input, for example, by using an electronic pen or a part of a body of a user.

The communication interface 170 establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106).

The wireless communication may use, as a cellular communication protocol, for example, at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM). The wired communication may include, for example, wireless communication 164. The wireless communication 164 may include, for example, at least one of WiFi, Bluetooth, near field communication (NFC), and a GNSS. Depending on a usage area or bandwidth, the GNSS may include, for example, at least one of a global positioning system (GPS), a global navigation satellite system (Glonass), a Beidou navigation satellite system ("Beidou"), and Galileo, and the European global satellite-based navigation system. Hereinbelow, "GPS" may be used interchangeably with "GNSS". The wired communication may include, for example, at least one of USB, a high definition multimedia interface (HDMI), recommended standard232 (RS-232), and a plain old telephone service (POTS). The network 162 may include a telecommunications network, for example, at least one of a computer network (e.g., a local area network (LAN) or a wide area network (WAN)), Internet, and a telephone network.

Each of the first external electronic device 102 and the second external electronic device 104 may be a device of the same type as or a different type than the electronic device 101. According to an embodiment of the present disclosure, the server 106 may include a group of one or more servers. According to various embodiments of the present disclosure, some or all of operations performed by the electronic device 101 may be performed in another electronic device or a plurality of electronic devices (e.g., the electronic device 102 or 104, or the server 106). According to an embodiment of the present disclosure, when the electronic device 101 has to perform a function or a service automatically or at a request, the electronic device 101 may request another device (e.g., the electronic devices 102 or 104 or the server 106) to perform at least some functions associated with the function or the service instead of or in addition to executing the function or the service. The another electronic device (e.g., the electronic device 102 or 104 or the server 106) may execute the requested function or additional function and deliver the execution result to the electronic device 101. The electronic device 101 may then process or further process the received result to provide the requested function or service. To that end, a cloud computing, distributed computing, or client-server computing technology may be used, for example.

The processor 120 processes at least a part of information obtained from other elements (e.g., the memory 130, the I/O interface 150, and the communication interface 170) and uses the information in various ways. For example, the processor 120 may control at least some functions of the electronic device 101 to cause the electronic device 101 to interwork with another electronic device (e.g., the electronic device 102, the electronic device 104, or the server 106). The processor 120 may be integrated in the communication interface 170. According to an embodiment, at least one element of the processor 120 may be included in the server 106, and at least one operation implemented in the processor 120 may be supported by the server 106.

According to an embodiment, the memory 130 may include instructions for operating the processor 120. For example, the memory 130 may include instructions for causing the processor 120 to control other elements of the electronic device 101 and to interwork with the other electronic device 102 or 104 or the server 106. The processor 120 controls other elements of the electronic device 101 and interworks with the other electronic device 102 or 104 or the server 106 based on the instructions stored in the memory 130. Hereinafter, operations of the electronic device 101 will be described based on each element of the electronic device 101. The instructions for causing the elements of the electronic device 101 to operate may be included in the memory 130.

According to various embodiments of the present disclosure, the electronic device 101 may include a first body portion, a second body portion, a first display arranged on the first body portion, and a second display arranged on the second body portion.

In an embodiment, a surface of the second body portion is hinge-coupled with the first body portion to contact a surface of the first body portion, in which the first display is arranged on the other surface of the first body portion and the second display is arranged on the other surface of the second body portion. As being arranged on the other surface of the first body portion, the first display is oriented in a first direction in which the other surface of the first body portion is directed, and as being arranged on the other surface of the second body portion, the second display is oriented in a second direction in which the other surface of the second body portion is oriented.

The following description will be made of structures of the first body portion, the second body portion, the first display, and the second display, but the present disclosure is not limited thereto, and the structures of the first body portion, the second body portion, the first display, and the second display according to various embodiments will be described.

According to various embodiments of the present disclosure, the processor 120 may display a screen of a first application on the first display. The processor 120 displays the screen of the on-going application being executed, on the first display.

According to various embodiments of the present disclosure, the processor 120 may display at least one of an image associated with the first application, an image associated with first content executed through the first application, or an image associated with information obtained through the electronic device on the second display at a preset angle or less between the first body portion and the second body portion.

When one surface of the first body portion and one surface of the second body portion contact each other, an angle between the first body portion and the second body portion is preset to 0 degree.

The preset angle may be in a range in which a user viewing a screen of the first application displayed on the first display may not be able to view a screen displayed on the second display. In this case, the preset angle may be in a range of 0 degree to 90 degrees.

The preset angle may also be in a range in which the user viewing the screen of the first application displayed on the first display may not be able to view the entire screen displayed on the second display. For example, the preset angle may be in a range in which the user may be able to view only at least a region of the screen displayed on the second display. In this case, the preset angle may be in a range of 0 degree to 180 degrees.

According to various embodiments of the present disclosure, an image displayed on the second display may include at least one of an image provided by a provider of the first application or the first content, an image configured in the first application or the first content, an image pertaining to second content or a second application associated with the first application or the first content, or an image pertaining to an advertisement determined based on information obtained by the electronic device. The image displayed on the second display is an image that represents taste, propensity, or application or content of a user of the electronic device 101, and a detailed example of the images will be described later.

The information obtained through the electronic device 101 may be obtained through various sensors included in the electronic device 101 or may be obtained from another electronic device outside the electronic device 101. The information obtained through the electronic device 101 may include at least one of location information, time information, and weather information of the electronic device 101. In addition to the above-described information, various information obtained in the electronic device 101 may also be used.

According to various embodiments of the present disclosure, the processor 120 may determine whether to operate the second display according to the first application or the first content executed through the first application. To reduce power consumption at the preset angle or less between the first body portion and the second body portion, one of the first display and the second display may be in a turn-off state. For example, if it is determined that the user looks at the first display, the processor 120 may turn off the second display or may maintain the turn-off state of the second display at the preset angle or less between the first body portion and the second body portion.

However, once an application or content configured to use both the first display and the second display is executed, the processor 120 turns on the turned-off display.

Once determining to operate the second display, the processor 120 may display at least one of the image associated with the first content executed through the first application or the image associated with the information obtained through the electronic device on the second display.

According to various embodiments of the present disclosure, the processor 120 obtains direction information of the electronic device 101 through a sensor included in the electronic device 101. For example, the processor 120 may obtain the direction information of the electronic device 101 through a gyro sensor included in the electronic device 101.

The processor 120 senses whether the direction of the electronic device 101 is changed, based on the obtained direction information of the electronic device 101. Once the processor 120 senses the change of the direction of the electronic device 101, the processor 120 determines a third direction in which the first display is oriented and which is changed from the first direction due to the change of the direction of the electronic device 101. While the following description will be made based on a direction in which the first display is oriented, but the present disclosure is not limited thereto and a direction in which the second display is oriented may also be used.

The processor 120 determines an angle between the first direction and the third direction based on a result of determination. When the determined angle is greater than or equal to a first threshold value and is less than a second threshold value, the processor 120 displays the information associated with the first application or the first content on the second display, together with the image displayed on the second display, at the same time. A detailed example of the information associated with the first application or the first content will be described later.

In an embodiment, the first threshold value may be set based on a magnitude of an angle at which the user is able to see the second display. For example, in a state where one surface of the first body portion and one surface of the second body portion contact each other, assuming that the user becomes able to see the second display when the angle between the first direction and the third direction is greater than and equal to 90 degrees, the first threshold value may be set to an angle close to 90 degrees, for example, an angle in a range between 80 degrees and 100 degrees.

The second threshold value may be set based on a magnitude of an angle for determining whether the electronic device 101 is flipped. For example, in the state where one surface of the first body portion and one surface of the second body portion contact each other, assuming that the electronic device is completely flipped when the angle between the first direction and the third direction is equal to 180 degrees, the first threshold value may be set to an angle close to 180 degrees, for example, an angle in a range between 160 degrees and 180 degrees.

As such, the first threshold value and the second threshold value may be set based on a current state of the first body portion and the second body portion, for example, the angle between the first body portion and the second body portion. However, this example is only for description, but the present disclosure is not limited by this example, and various methods may be used to determine a display the user may see from among the plurality of displays included in the electronic device 101. For example, a display the user may see may also be determined depending on a manner in which the user holds the electronic device 101 or by tracking a user's eye.

The processor 120 may also determine a size of a first region where the image is displayed on the second display and a size of a second region where the information associated with the first application or the first content is displayed, depending on a magnitude of the determined angle. For example, as the magnitude of the determined angle increases, the size of the second region may also increase; and the size of the first region may decrease as the size of the second region increases. In addition, as the magnitude of the determined angle decreases, the size of the second region may decrease; and the size of the first region may increase as the size of the second region decreases.

When the determined angle is greater than or equal to a second threshold value, the processor 120 displays the information associated with the first application or the first content on the second display. For example, when determining that the electronic device 101 is flipped, the processor 120 may display the information associated with the first application or the first content in place of the image displayed on the second display.

According to various embodiments of the present disclosure, once sensing the change of the direction of the electronic device 101 within a preset time after reception of an additional input of the user, the processor 120 determines the third direction in which the first display is oriented and which is changed from the first direction due to the direction change of the electronic device 101. For example, the processor 120 may display the information associated with the first application or the first content only when an additional input is received from the user as well as when the direction of the electronic device 101 is changed.

The preset additional input may include at least one of an input to touch at least one of the first display and the second display, a voice input corresponding to a preset voice, a gesture input corresponding to a preset gesture pattern, an input made through a motion of the electronic device corresponding to a preset pattern, or an input made through a function key of the electronic device. However, the present disclosure is not limited thereto, and any input that may be received through the I/O interface 150 included in the electronic device 101 may be used as the additional input.

Figure 2:
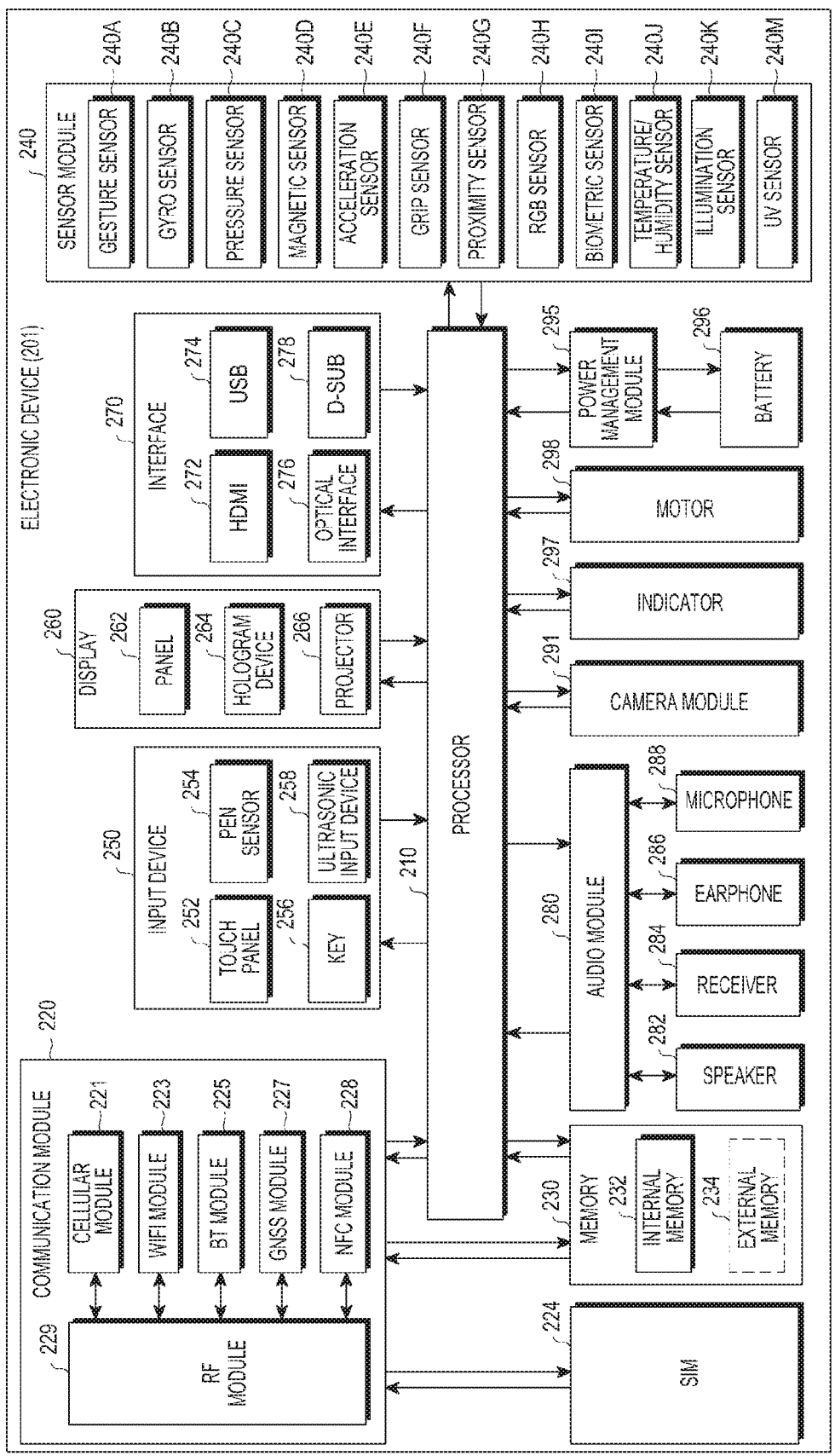
FIG. 2 is a block diagram of an electronic device according to various embodiments of the present disclosure.

FIG. 2 is a block diagram of an electronic device 201 according to various embodiments of the present disclosure.

The electronic device 201 may form the entire electronic device 101 illustrated in FIG. 1 or a part of the electronic device 101 illustrated in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 controls multiple hardware or software components connected to the processor 210 by driving an Operating System (OS) or an application program and performs processing and operations with respect to various data. The processor 210 may be implemented with, for example, a system on chip (SoC). According to an embodiment of the present disclosure, the server 106 may include a GPU and/or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

The communication module 220 may have a configuration that is the same as or similar to the communication interface 170. The communication module 220 may include, for example, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP). According to an embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), or an antenna. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 and/or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electric signal. The sensor module 240 may, for example, include at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, and/or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210.

The input device 250 may include, for example, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

In an embodiment, a display (e.g., the display 160) may include a first display 260 and a second display 265. The first display may include a first panel 262 and a first display driver integrated circuit (DDI) 264 configured to control the first panel 262. The first panel 262 includes a plurality of pixels (pixels), each of which may include sub-pixels (sub-pixels) that present three primary colors of light, RGB. Each of these sub-pixels includes at least one transistor and adjusts a pixel and presents a color based on a magnitude of a voltage applied to (or a current flowing through) the transistor. The first DDI 264 may include a gate driver circuit unit that has an on/off function and controls a gate of a sub-pixel (RGB) and a source driver circuit unit that generates a color difference by adjusting an image signal of the sub-pixel (RGB) and may provide the entire screen by adjusting a transistor of a sub-pixel of the first panel 262. The first DDI receives first image data from the processor 210 and operates to display an image on the first panel.

The second display may include a second panel 266 and a second DDI 268 configured to control the second panel 266. The second panel 266 includes several pixels (pixels), each of which may include sub-pixels (sub-pixels) that present three primary colors of light, RGB. Each of these sub-pixels includes at least one transistor and adjusts a pixel and presents a color based on a magnitude of a voltage applied to (or a current flowing through) the transistor. The second DDI 268 may include a gate driver circuit unit that has an on/off function and controls a gate of a sub-pixel (RGB) and a source driver circuit unit that generates a color difference by adjusting an image signal of the sub-pixel (RGB), and may provide the entire screen by adjusting a transistor of a sub-pixel of the second panel 266. The second DDI receives second image data that is the same as or different from the first image data from the processor 210 and operates to display an image on the second panel.

At least one of the first panel 262 or the second panel 266 may be implemented, for example, flat, flexibly, or bendibly in various embodiments. At least one of the first panel 262 or the second panel 266 may include one or more modules including the touch panel 252 and/or the pen sensor 254.

The first display 260 and the second display 265 (e.g., the display 160) may include another image output means (a holographic device, a projector, etc., not shown) and/or a control circuit for controlling the image output means.

In embodiments that implement a device including a plurality of displays, at least some of changes (e.g., image data, image data streams, etc.) in several modules and devices of a terminal may be processed using the processor 210. The processor may determine to output the changes on at least one of the first display 260 or the second display 265. For example, the processor may control the first display 260 to output an instruction received from the communication module 220 and the second display 265 to output an instruction received from the sensor module 240. In another embodiment, data output on the first display 260 may be displayed on a screen of the second display 265 after being switched and expanded, or data output on the second display 265 may be displayed on a screen of the first display after being switched and expanded.

The interface 270 may include an HDMI 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 bi-directionally converts sound and an electric signal. At least one element of the audio module 280 may be included in the I/O interface 150 illustrated in FIG. 1. The audio module 280 processes sound information input or output through the speaker 282, the receiver 284, the earphone 286, or the microphone 288. The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.). The power management module 295 manages power of the electronic device 201. According to an embodiment, the power management module 295 may include a power management integrated circuit (PMIC), a charger IC, or a battery fuel gauge. The PMIC may have a wired and/or wireless charging scheme. The wireless charging scheme includes a magnetic-resonance type, a magnetic induction type, and an electromagnetic type, and may further include an additional circuit for wireless charging, for example, a coil loop, a resonance circuit, or a rectifier. The battery gauge measures the remaining capacity of the battery 296 or the voltage, current, or temperature of the battery 296 during charging. The battery 296 may include, for example, a rechargeable battery and/or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
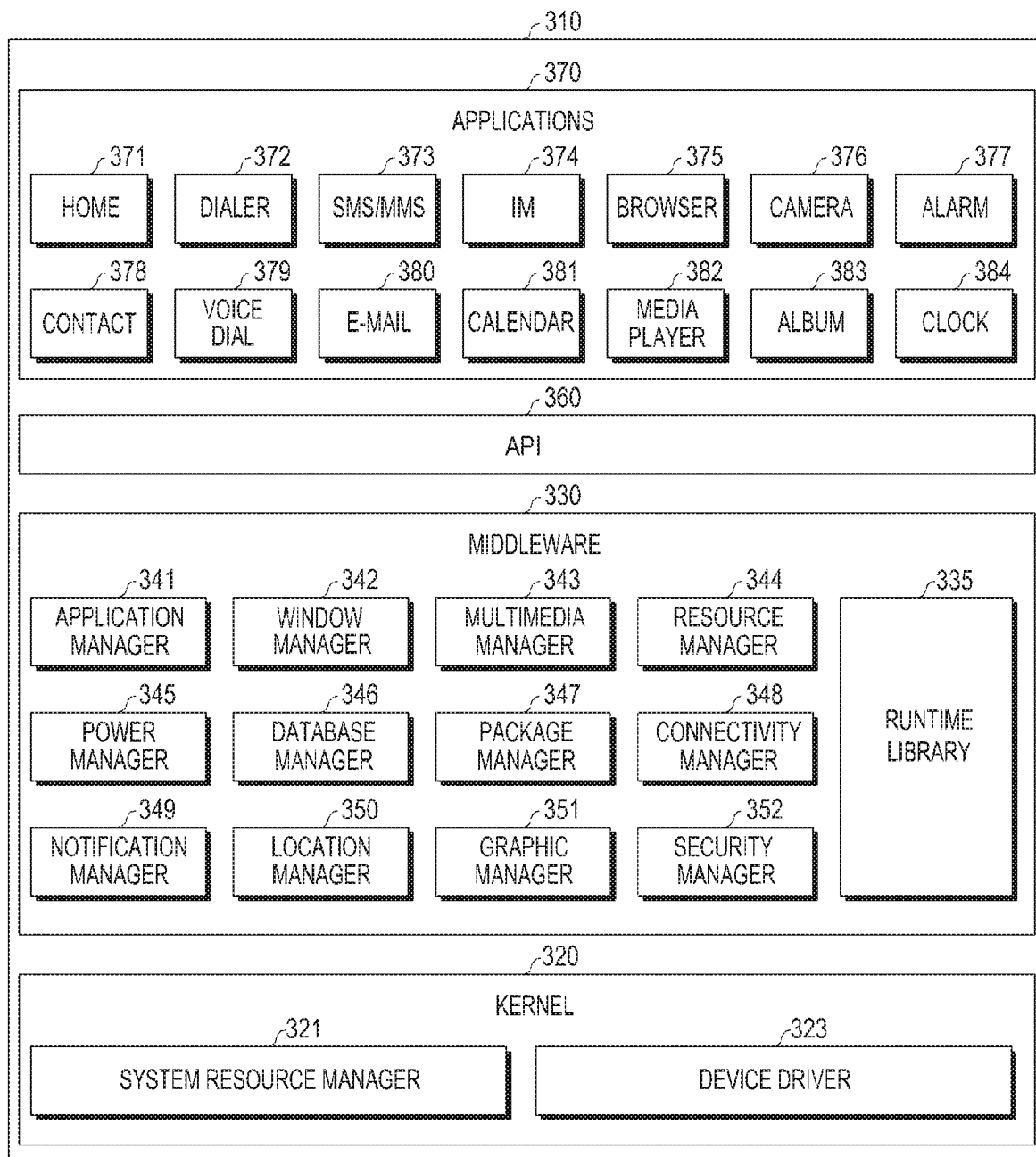
FIG. 3 is a block diagram of a programming module according to various embodiments of the present disclosure.

FIG. 3 is a block diagram of a programming module according to various embodiments. According to an embodiment, a programming module 310 (e.g., the program 140) may include an OS for controlling resources associated with an electronic device (e.g., the electronic device 101) and/or various applications (e.g., the application program 147) executed on the OS. The OS may include, for example, Android™, iOS™, Windows™, Symbian™, Tizen™, Bada™, or the like.

The programming module 310 may include, for example, a kernel 320, middleware 330, an application programming interface (API) 360, and/or an application 370. At least a part of the programming module 310 may be preloaded on an electronic device or may be downloaded from an external device (e.g., the vehicle device 102, the electronic device 104, or the server 106).

The kernel 320 (e.g., the kernel 141) may include, for example, a system resource manager 321 and/or a device driver 323. The system resource manager 321 may perform control, allocation, retrieval of system resources, and so forth. According to an embodiment, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to efficiently use a limited system resource in an electronic device. According to an embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs functions related to an input/output, memory management, or calculation operation.

The application manager 341 manages a life cycle of at least one of the applications 370. The window manager 342 manages a GUI resource used on a screen. The multimedia manager 343 recognizes a format necessary for playing various media files and performs encoding or decoding with respect to a media file by using a codec appropriate to a corresponding format. The resource manager 344 manages a resource such as source code, a memory, or a storage space of at least one of the applications 370.

The power manager 345 manages a battery or power, for example, in operation with a basic input/output system (BIOS) and provides power information necessary for an operation of the electronic device. The database manager 346 performs a management operation to generate, search or change a database used for at least one application among the applications 370. The package manager 347 manages the installation or update of an application distributed in a package file format.

The connectivity manager 348 manages a wireless connection such as a WiFi or Bluetooth connection. The notification manager 349 displays or notifies events such as arrival messages, appointments, and proximity alerts in a manner that is not disruptive to a user. The location manager 350 manages location information of an electronic device. The graphic manager 351 manages a graphic effect to be provided to a user or a user interface relating thereto. The security manager 352 provides a general security function necessary for system security or user authentication. According to an embodiment, if the electronic device (e.g., the electronic device 101) has a call function, the middleware 330 may further include a telephony manager for managing a voice or video call function of the electronic device.

The middleware 330 may include a middleware module forming a combination of various functions of the above-mentioned internal elements. The middleware 330 may provide modules specified according to types of OS so as to provide distinctive functions. Additionally, the middleware 330 may delete some of existing elements or add new elements dynamically.

The API 360 (e.g., the API 145) may be provided as a set of API programming functions with a different configuration according to the OS. For example, in Android or iOS, one API set may be provided for each platform, and in Tizen, two or more API sets may be provided for each platform.

The application 370 (e.g., the application program 147) may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384, a health care application (e.g., an application for measuring an exercise amount, a blood sugar, etc.), or an environment information providing application (e.g., an application for providing air pressure, humidity, or temperature information or the like).

According to an embodiment, the application 370 may include an application (hereinafter, an "information exchange application" for convenience) supporting information exchange between the electronic device (e.g., the electronic device 101) and an external electronic device (e.g., the electronic device 102 or 104). The information exchange application may include, for example, a notification relay application for transferring specific information to the external electronic device or a device management application for managing the external electronic device.

For example, the notification relay application may include a function for transferring notification information generated in another application (e.g., an SMS/MMS application, an e-mail application, a health care application, or an environment information application) of the electronic device to an external electronic device (e.g., the electronic device 102 or 104). The notification relay application may receive notification information from an external electronic device to provide the same to a user.

The device management application may manage (e.g., install, remove, or update) at least one function (e.g., turn on/turn off of an external electronic device itself (or a part thereof) or control of brightness (or resolution) of a display) of an external device (e.g., the electronic device 102 or 104) communicating with the electronic device, a service provided by an application operating in an external electronic device or provided by the external electronic device (e.g., a call service or a message service).

According to an embodiment, the application 37 may include an application (e.g., device health care application of mobile medical equipment) designated according to an attribute of the external electronic device (e.g., the electronic device 102 or 104). According to an embodiment, the application 37 may include an application received from the external electronic device (e.g., the server 106 or the electronic device 102 or 104). According to an embodiment, the application 370 may include a preloaded application or a third-party application that may be downloaded from the server. Names of elements of the programming module 310 according to the illustrated embodiment may vary depending on a type of an OS.

According to various embodiments, at least a part of the programming module 310 may be implemented by software, firmware, hardware, or a combination of at least two of them. The at least a part of the programming module 310 may be implemented (e.g., executed) by a processor (e.g., the processor 210). The at least a part of the programming module 310 may include, for example, modules, programs, routines, sets of instructions, or processes for performing one or more functions.

Figure 4A:
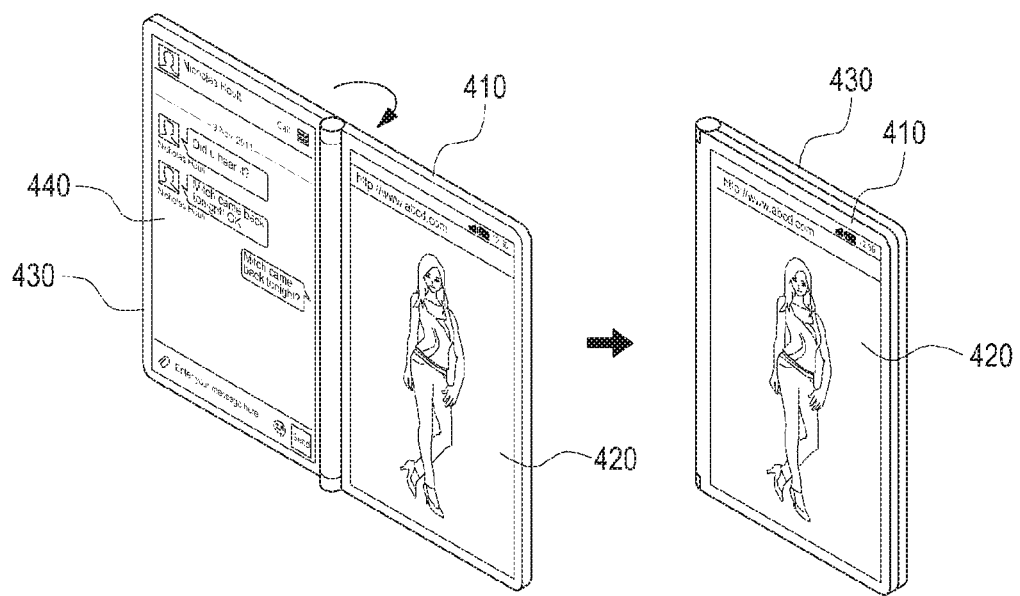
FIGS. 4A and 4B show an electronic device according to various embodiments of the present disclosure.
Figure 4B:
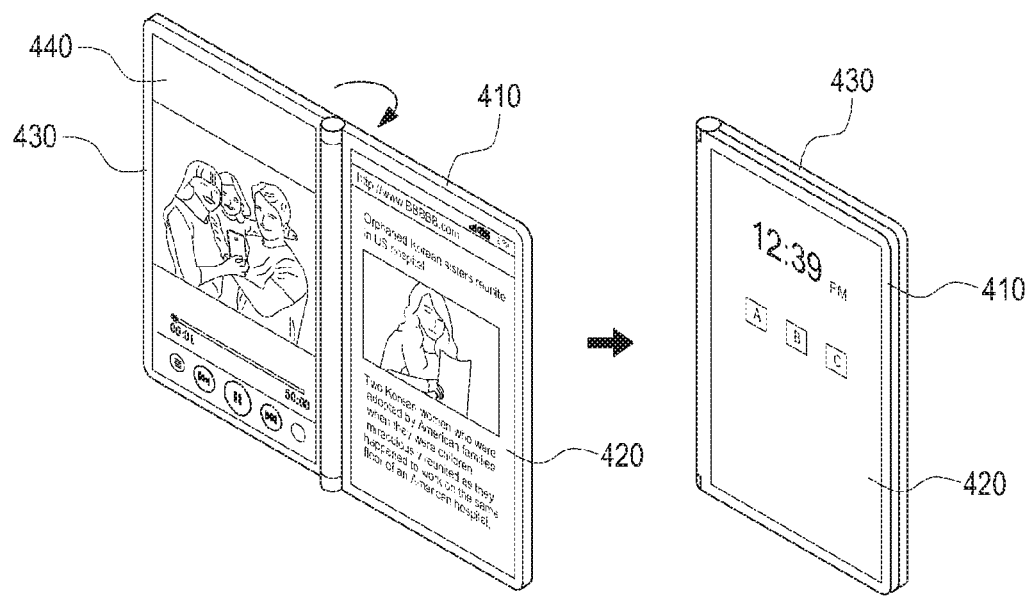

FIGS. 4A and 4B show an electronic device according to various embodiments of the present disclosure.

According to various embodiments of the present disclosure, the electronic device 101 may include a first body portion 410 and a second body portion 430. The first body portion 410 and the second body portion 430 are coupled to pivot with respect to each other. Referring to FIG. 4A, the first body portion 410 and the second body portion 430 are hinge-coupled to each other in such a way that one surface of the first body portion 410 and one surface of the second body portion 430 contact each other. The first body portion 410 and the second body portion 430 may be coupled through a hinge member.

The first body portion 410 and the second body portion 430 are structured as a single body portion without a separate connection member, and the single body portion is provided such that the first body portion 410 and the second body portion 430 pivot with respect to each other.

Referring to FIG. 4A, the first display 420 is arranged on the other surface of the first body portion 410, and the second display 440 is arranged on the other surface of the second body portion 430. A display may also be arranged on each of one surface and the other surface of the first body portion 410, and a display may be arranged on each of one surface and the other surface of the second body portion 430.

In an embodiment, a processor (e.g., the processor 120) of the electronic device 101 displays an execution screen of the first application through the first display 420 arranged on the first body portion 410 in a state where the first body portion 410 and the second body portion 430 are opened or unfolded. The state where the first body portion 410 and the second body portion 430 are opened may indicate a state where the user may see both the first display 420 arranged on the first body portion 410 and the second display 440 arranged on the second body portion 430 without moving the electronic device 101.

For example, the state where the first body portion 410 and the second body portion 430 are opened may indicate a state where the user may see the first display 420 and the second display 440 at the same time as when the angle between the first body portion 410 and the second body portion 430 is 180 degrees or within a preset angle with respect to 180 degrees.

The first application may be a web browser application, and a screen of a particular web site accessed through a web application may be displayed on the first display 420.

The processor may display an execution screen of the second application or an execution screen of the first application through the second display 440 arranged on the second body portion 430 in the state where the first body portion 410 and the second body portion 430 are opened. The processor may display the execution screen of the first application over the first display 420 and the second display 440 and display the execution screen of the first application and the execution screen of the second application through the first display 420 and the second display 440, respectively.

In an embodiment, when at least one of the first body portion 410 and the second body portion 430 rotates such that one surface of the first body portion 410 contacts one surface of the second body portion 430, a direction in which the first display 420 arranged on the other surface of the first body portion 410 is oriented and a direction in which the second display 440 arranged on the other surface of the second body portion 430 is oriented may be oriented outward from the electronic device 101 as shown in FIG. 4A.

When one surface of the first body portion 410 and one surface of the second body portion 430 contact each other, a screen displayed through the first display 420 may be maintained. A screen displayed through the second display 440 may also be maintained, and the second display 440 may be turned off to reduce power consumption.

In an embodiment, although not shown in FIG. 4A, when at least one of the first body portion 410 and the second body portion 430 rotates such that the other surface of the first body portion 410 contacts the other surface of the second body portion 430, the direction in which the first display 420 arranged on the other surface of the first body portion 410 is oriented and the direction in which the second display 440 arranged on the other surface of the second body portion 430 is oriented may be oriented to face each other. In this case, the first display 420 and the second display 440 may not be exposed to outside.

Referring to FIG. 4B, when at least one of the first body portion 410 and the second body portion 430 rotates such that the other surface of the first body portion 410 contacts the other surface of the second body portion 430, the screen displayed through the first display 420 prior to contact between the first body portion 410 and the second body portion 430 may be changed into a preset screen or an execution screen of a third application. To reduce power consumption, the preset screen may be displayed on a region of the first display 420 in place of the entire region of the first display 420. In this way, the electronic device 101 displays the preset screen with lower power than when screen is displayed on the entire first display 420. For example, the preset screen may include a lock screen, a home screen, an idle screen, etc., and other user-set screens.

The direction of the electronic device 101 is determined based on direction information obtained through a sensor included in the electronic device 101, and the preset screen or the execution screen of the third application is displayed on the second display 440 based on the determined direction information of the electronic device 101. For example, the electronic device 101 may determine a display at which the user stares based on the direction of the electronic device 101 and may display the preset screen or the execution screen of the third application on the determined display at which the user stares.

As such, according to whether the first body portion 410 and the second body portion 430 contact, the screen displayed on at least one of the first display 420 and the second display 440 may be maintained or changed or whether to operate the display may be determined. Even when the first body portion 410 and the second body portion 430 do not contact each other, the screen may be changed or whether to operate the display may be determined, according to the angle between the first body portion 410 and the second body portion 430.

In an embodiment, when the first body portion 410 and the second body portion 430 are in proximity to each other as well as when the first body portion 410 and the second body portion 430 contact each other, for example, even when the angle between the first body portion 410 and the second body portion 430 is a preset angle or less, the screen displayed on the first display 420 and the second display 440 may be changed or whether to operate the display may be determined.

However, this example is only for description and the present disclosure is not limited thereto, and according to user's setting or an application to be executed as well as the angle between the first body portion 410 and the second body portion 430, the screens displayed on the first display 420 and the second display 440 may be determined. According to user's setting or an application to be executed, whether to operate the first display 420 and the second display 450 may also vary.

In an embodiment, although not shown, a third display may be arranged on one surface of the first body portion 410. In this case, when the other surface of the first body portion 410 and the other surface of the second body portion 430 contact each other, a direction in which the third display is oriented may be oriented outward from the electronic device 101, opposing the direction in which the first display 420 is oriented.

The third display may be driven with lower power than the first display 420 and the second display 440. Thus, the third display is turned on at all times prior to reception of a designed input (e.g., a screen lock key input), and designated information (e.g., a current time, a battery state, an on-going condition, or various notification information (a message notification, an absent call, etc.) is configured to be displayed on the third display.

In an embodiment, the third display may be controlled by a processor (e.g., the processor 120) that controls an overall function of the electronic device 101. The electronic device 101 may include a separate low-power processor for driving the third display with low power. When the electronic device 101 includes a low-power processor, a function of displaying the designated information on the third display may be performed by the low-power processor.

In an embodiment, the electronic device 101 may determine a display on which the designated information is to be displayed from among the plurality of displays, according to whether one surfaces or the other surfaces of the first body portion 410 and the second body portion 430 contact. When the other surface of the first body portion 410 and the other surface of the second body portion 430 contact each other, the designated information may be displayed on the third display. When one surface of the first body portion 410 and one surface of the second body portion 430 contact each other, the electronic device 101 may display the designated information on at least one of the first display 420 and the second display 440.

The electronic device 101 may also determine a display on which the designated information is to be displayed from among the plurality of displays, according to the angle between the first body portion 410 and the second body portion 430. For example, when one surface of the first body portion 410 and one surface of the second body portion 430 contact each other, the angle between the first body portion 410 and the second body portion 430 is set to 0 degree, and when the angle is less than or equal to a preset angle, the electronic device 101 may display the designated information may on at least one of the first display 420 and the second display 440.

When the angle between the first body portion 410 and the second body portion 430 exceeds a preset angle, the electronic device 101 may display the designated information on the third display.

FIGS. 5A through 5E illustrate various operating types of an electronic device according to various embodiments of the present disclosure.

Figure 5A:
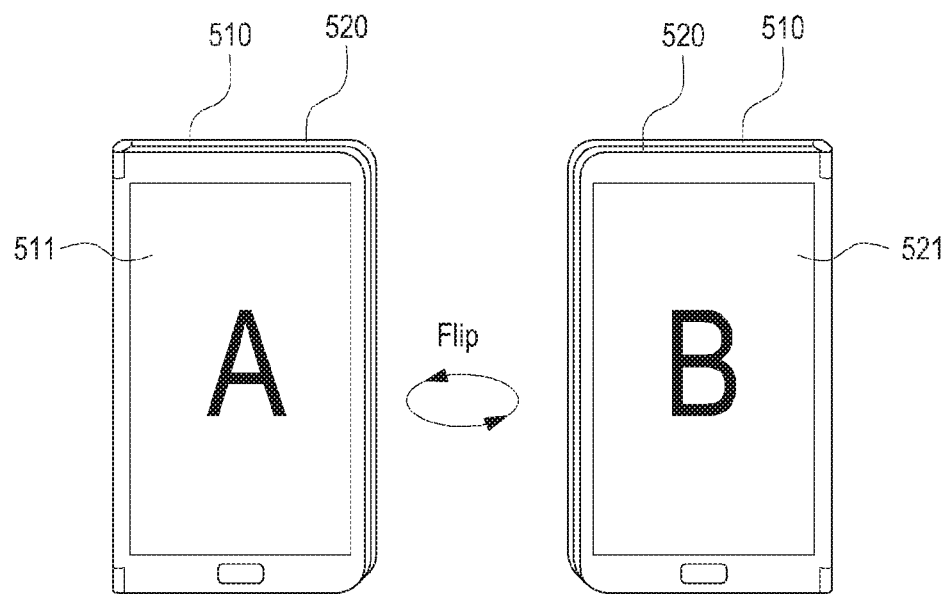

As shown in FIG. 5A, the electronic device 101 may be flipped by the user. When the electronic device 101 is flipped, it may mean that the electronic device 101 is turned over. The electronic device 101 may include a sensor for obtaining direction information of the electronic device 101 and determines by using the direction information of the electronic device 101 obtained from the sensor whether the electronic device 101 is flipped.

For example, as shown in FIG. 5A, in a state where a first body portion 510 and a second body portion 520 contact each other, the electronic device 101 may determine at least one of a direction in which a first display 511 arranged on the first body portion 510 is oriented and a direction in which a second display 521 arranged on the second body portion 520 is oriented, based on the direction information of the electronic device 101 obtained through the sensor.

The electronic device 501 determines whether the electronic device 101 is flipped, based on at least one of the determined direction in which the display 511 is oriented and the determined direction in which the second display 521 is oriented. When at least one of the determined direction in which the display 511 is oriented and the determined direction in which the second display 521 is oriented is changed into an opposite direction, the electronic device 101 determines that the electronic device 101 is flipped.

For example, the electronic device 101 may determine angles between the determined at least one of the determined direction in which the display 511 is oriented and the determined direction in which the second display 521 is oriented, the previous direction in which the first display 511 is oriented, and the previous direction in which the second display 521 is oriented and may determine whether the electronic device 101 is flipped, based on the determined angles.

Figure 5B:
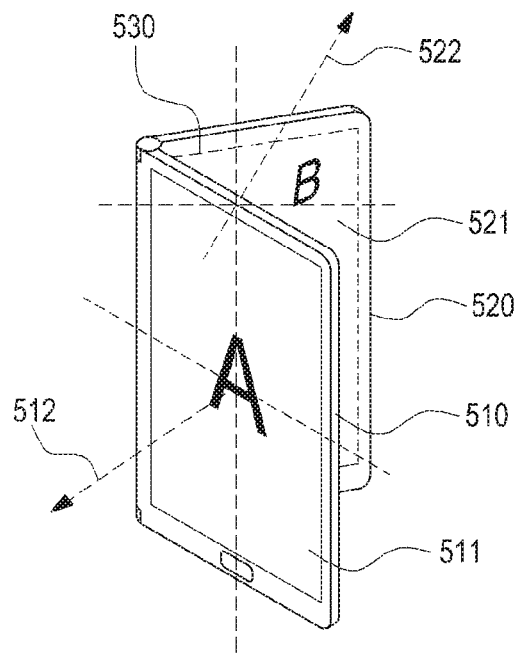

Referring to FIG. 5B, a direction 512 in which the first display 511 arranged on the first body portion 510 is oriented is perpendicular to the first display 511. Similarly, a direction 522 in which the second display 521 arranged on the second body portion 520 is oriented is perpendicular to the second display 521.

However, this example is only for description, and the present disclosure is not limited thereto, and the direction in which the first display 511 is oriented and the direction in which the second display 521 is oriented may be set in various ways to determine motion of the electronic device 101.

FIG. 5C shows the electronic device 101 in a state where the first body portion 510 and the second body portion 520 are opened. In the state where the first body portion 510 and the second body portion 520 are opened, the electronic device 101 may display an execution screen of an application A over the first display 511 and the second display 521 or may display an execution screen of the application A and an execution screen of an application B on the first display 511 and the second display 521, respectively.

As shown in (a), (b), and (c) of FIG. 5C, the electronic device 101 displays the execution screen of the application A and the execution screen of the application B on the first display 511 and the second display 521, respectively, based on the direction of the electronic device 101.

FIG. 5D shows the electronic device 101 in a standing state where an angle between the first body portion 510 and the second body portion 520 maintains a preset angle. The angle between the first body portion 510 and the second body portion 520 maintains the preset angle such that the electronic device 101 stands.

In this case, as shown in (a) of FIG. 5D, one of the first display 511 and the second display 521 may not be turned off. As shown in (b) of FIG. 5D, according to user's setting or an application to be executed, both the first display 511 and the second display 521 may be turned on.

FIG. 5E shows the electronic device 101 in which one of the first display 511 and the second display 521 is positioned on a bottom surface. The user may arrange one of the first display 511 and the second display 521 on the bottom surface and make the other display stand to maintain a preset angle or more with respect to the display positioned on the bottom surface.

The electronic device 101 may recognize that the display positioned on the bottom surface is positioned on the bottom surface, by using a sensor of the display. The electronic device 101 turns on only the other display and turns off the display positioned on the bottom surface.

For example, as shown in (a) of FIG. 5E, when the second display 521 is positioned on the bottom surface and the first display 511 is used in the standing state thereof, the electronic device 101 may turn on only the first display 511 and display the execution screen of the application A.

Similarly, as shown in (b) of FIG. 5E, when the first display 511 is positioned on the bottom surface and the second display 521 is used in the standing state thereof, the electronic device 101 may turn on only the second display 521 and display the execution screen of the application B.

FIGS. 6A through 6D are views for describing various operation modes with respect to an angle between a first body portion and a second body portion according to various embodiments of the present disclosure.

FIG. 6A shows the electronic device 101 that operates in a first mode, when the first body portion 510 and the second body portion 520 of the electronic device 101 are closed or folded as shown in FIG. 5A or when the angle between the first body portion 510 and the second body portion 520 is a preset angle or less.

As shown in FIG. 6A, the electronic device 101 determines the operation mode of the electronic device 101 as the first mode according to an angle 530 between the first body portion 510 and the second body portion 520. For example, when the angle 530 between the first body portion 510 and the second body portion 520 is between 0 degree to 20 degrees, the electronic device 101 may operate in the first mode.

In the first mode, the electronic device 101 turns on only one of the first display 511 and the second display 521. However, when there is an existing screen of an application displayed through the second display 521, execution of the application may not be terminated. In addition, the electronic device 101 turns on both the first display 511 and the second display 521 according to user's manipulation and an application being set or executed.

Moreover, the electronic device 101 determines whether the electronic device 101 is flipped, based on the direction information of the electronic device 101, and determines a display to be turned on based on the determination. The electronic device 101 may use the turned-off display as an input means for backside touch.

FIG. 6B shows the electronic device 101 that operates in a second mode when the first body portion 510 and the second body portion 520 are opened as in FIG. 5C. As shown in FIG. 6B, the electronic device 101 determines the operation mode of the electronic device 101 as the second mode according to the angle 530 between the first body portion 510 and the second body portion 520. For example, when the angle 530 between the first body portion 510 and the second body portion 520 is between 170 degrees and 210 degrees, the electronic device 101 may operate in the second mode.

In the second mode, the electronic device 101 may turn on both the first display 511 and the second display 521 and may display the execution screen of the first application over the first display 511 and the second display 521 or may display the execution screen of the first application and the execution screen of the second application on the first display 511 and the second display 521, respectively.

Figure 6C:
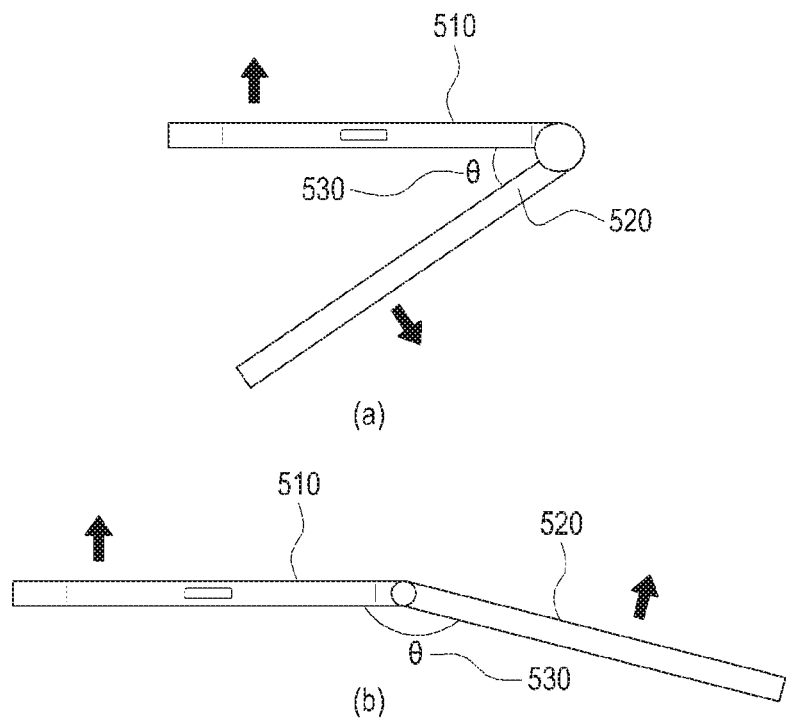

FIG. 6C shows the electronic device 101 that operates in a third mode when the angle between the first body portion 510 and the second body portion 520 maintains a preset angle and the electronic device 101 is in the standing state as in FIG. 5D.

As shown in FIG. 6C, the electronic device 101 determines the operation mode of the electronic device 101 as the third mode according to the angle 530 between the first body portion 510 and the second body portion 520. For example, when the angle 530 between the first body portion 510 and the second body portion 520 is between 20 degrees and 170 degrees, the electronic device 101 may operate in the third mode.

In the third mode, the electronic device 101 may turn on one of the first display 511 and the second display 521. However, when there is an existing screen of an application displayed through the second display 521, execution of the application may not be terminated. In addition, the electronic device 101 turns on both the first display 511 and the second display 521 according to user's manipulation and an application being set or executed.

Moreover, the electronic device 101 determines a display to be turned on based on the direction information of the electronic device 101. The electronic device 101 may use the turned-off display as an input means for backside touch.

Figure 6D:
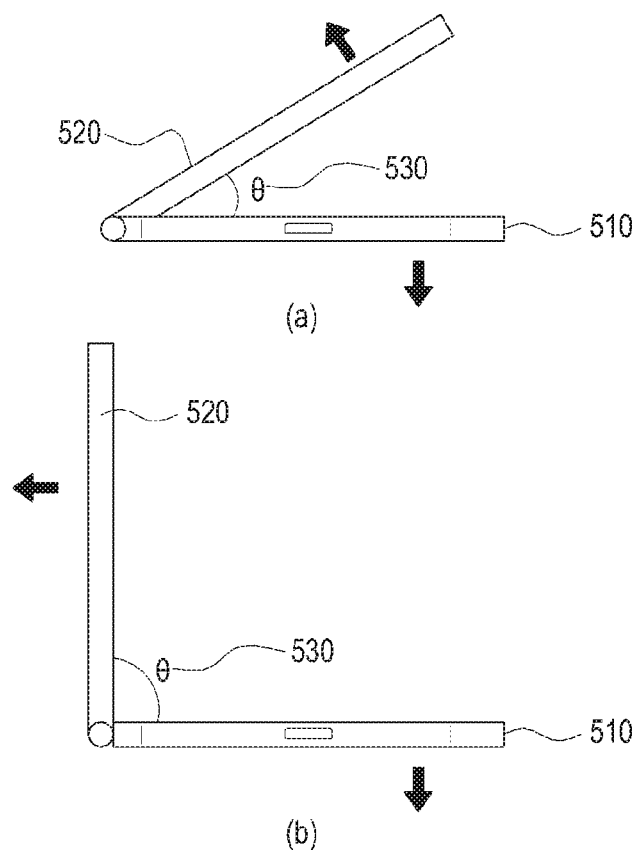

FIG. 6D shows the electronic device 101 that operates in a fourth mode when one of the first body portion 510 and the second body portion 520 is positioned on the bottom surface, as in FIG. 5E.

As shown in FIG. 6D, the electronic device 101 determines the operation mode of the electronic device 101 as the fourth mode according to the angle 530 between the first body portion 510 and the second body portion 520, when the one of the first display 511 and the second display 521 is positioned on the bottom surface. The electronic device 101 may recognize that the display positioned on the bottom surface is positioned on the bottom surface, by using a sensor of the display.

For example, when the angle 530 between the first body portion 510 and the second body portion 520 is between 20 degrees and 90 degrees in a state where the first display 511 is positioned on the bottom surface, the electronic device 101 may operate in the fourth mode.

In the fourth mode, the electronic device 101 turn on only the display positioned on the bottom surface and turns on the other display. For example, when the first display 511 is positioned on the bottom surface, the first display 511 may be turned off and the second display 521 may be turned on.

The above-described operation modes of the electronic device are examples for description, and the present disclosure is not limited to these examples. The operations described as being performed in each operation mode may also be performed in another operation mode, and the operation modes may be subdivided. It would be apparent to a person skilled in the art that the angle between the first body portion 410 and the second body portion 430 described to distinguish the operation modes may also be set variously.

Figure 7:
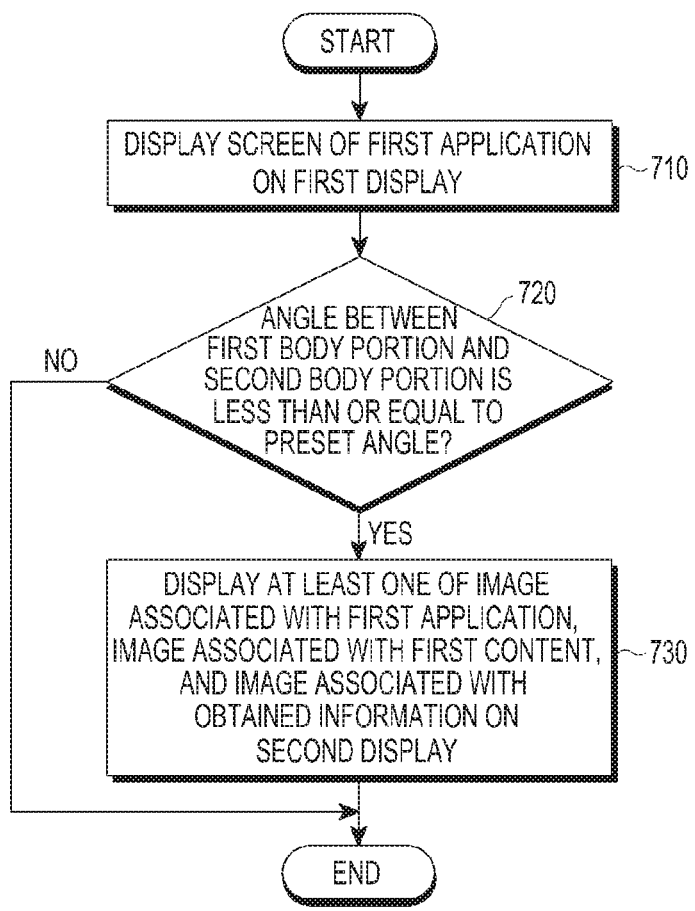
FIG. 7 is a flowchart illustrating an operation method of an electronic device according to various embodiments of the present disclosure.

FIG. 7 is a flowchart illustrating an operation method of an electronic device according to various embodiments of the present disclosure.

In operation 710, the electronic device 101 displays the screen of the first application on the first display. The electronic device 101 displays the screen of the on-going application being executed, on the first display.

In operation 720, the electronic device 101 determines whether an angle between the first body portion and the second body portion is less than or equal to a preset angle. The preset angle may be in a range in which a user viewing a screen of the first application displayed on the first display may not be able to view a screen displayed on the second display. The preset angle may also be in a range in which the user viewing the screen of the first application displayed on the first display may not be able to view the entire screen displayed on the second display.

In operation 730, the electronic device 101 displays at least one of an image associated with the first application, an image associated with first content executed through the first application, or an image associated with information obtained through the electronic device on the second display at a preset angle or less between the first body portion and the second body portion.

Figure 8:
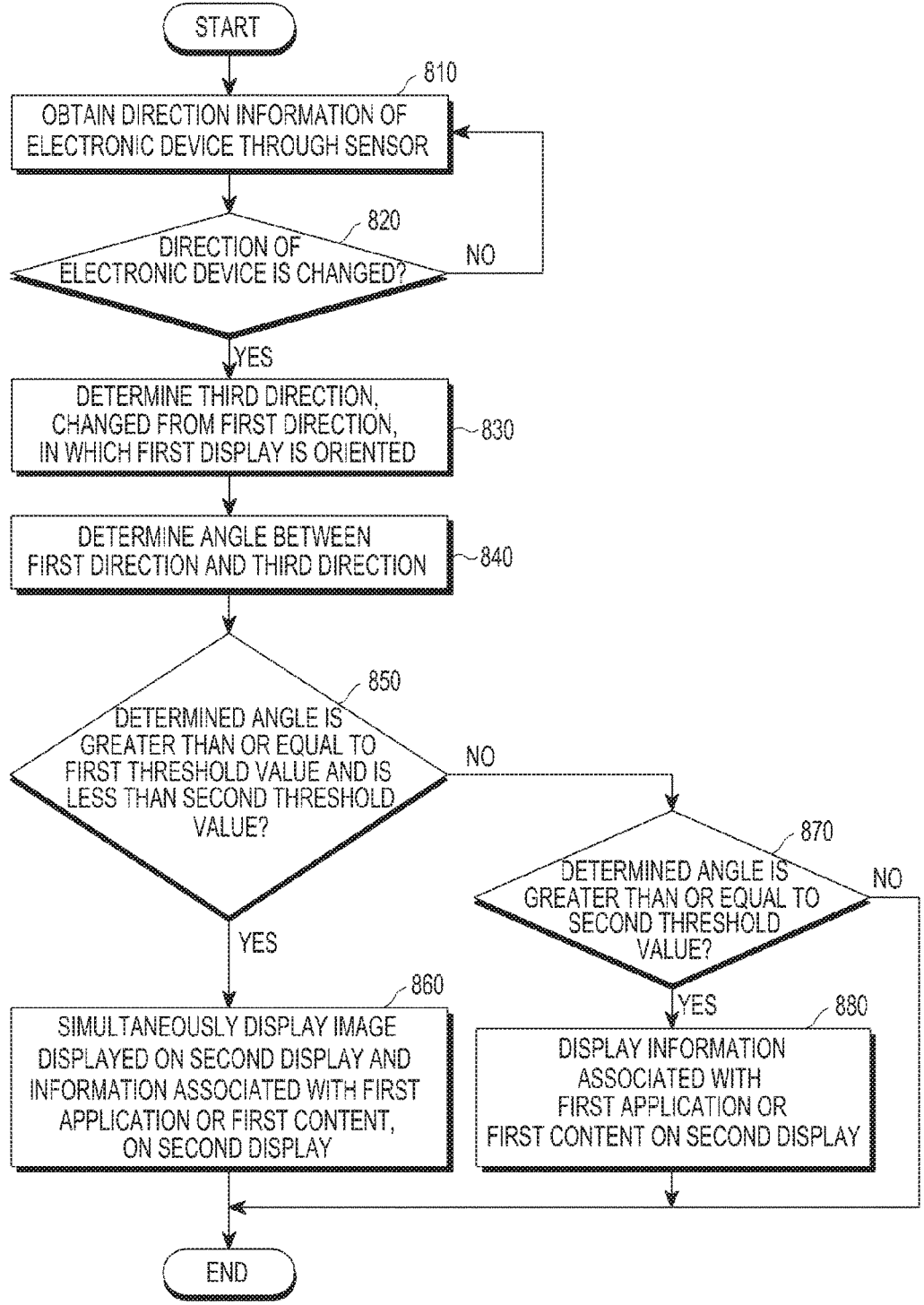
FIG. 8 is a flowchart illustrating a method for determining a screen displayed on one of a plurality of displays by an electronic device according to various embodiments of the present disclosure.

FIG. 8 is a flowchart illustrating a method for determining a screen displayed on one of a plurality of displays by an electronic device according to various embodiments of the present disclosure.

In operation 810, the electronic device 101 obtains direction information of the electronic device 101 through a sensor included in the electronic device 101. For example, the electronic device 101 may obtain the direction information of the electronic device 101 through a gyro sensor included in the electronic device 101.

In operation 820, the electronic device 101 senses whether the direction of the electronic device 101 is changed, based on the obtained direction information of the electronic device 101.

In operation 830, once the electronic device 101 senses the change of the direction of the electronic device 101, the electronic device 101 determines the third direction in which the first display is oriented and which is changed from the first direction due to the change of the direction of the electronic device 101.

In operation 840, the electronic device 101 determines the angle between the first direction and the third direction based on a result of determination.

In operation 850, the electronic device 101 determines whether the determined angle is greater than or equal to the first threshold value and is less than the second threshold value. The first threshold value may be set based on a magnitude of an angle at which the user is able to see the second display. In addition, the second threshold value may be set based on a magnitude of an angle for determining whether the electronic device 101 is flipped.

In operation 860, when the determined angle is greater than or equal to the first threshold value and is less than the second threshold value, the electronic device 101 displays the information associated with the first application or the first content on the second display, together with the image displayed on the second display, at the same time.

The electronic device 101 may also determine a size of the first region where the image is displayed on the second display and a size of the second region where the information associated with the first application or the first content is displayed, depending on a magnitude of the determined angle.

In operation 870, the electronic device 101 determines whether the determined angle is greater than or equal to the second threshold value.

In operation 880, when the determined angle is greater than or equal to the second threshold value, the electronic device 101 displays the information associated with the first application or the first content on the second display. For example, when determining that the electronic device 101 is flipped, the processor 120 may display the information associated with the first application or the first content in place of the image displayed on the second display.

FIGS. 9A through 9G illustrate a screen displayed on each of a plurality of displays by an electronic device according to various embodiments of the present disclosure.

According to various embodiments of the present disclosure, when the angle between the first body portion and the second body portion is equal to or less than the preset angle, the electronic device 101 may display a screen, which is different from the screen displayed on the first display 511 arranged on the first body portion 510, on the second display 521 arranged on the second body portion 520.

The electronic device 101 displays the screen of the first application on the first display 511 and displays at least one of an image associated with the first application, an image associated with first content executed through the first application, or an image associated with information obtained through the electronic device on the second display.

Figure 9A:
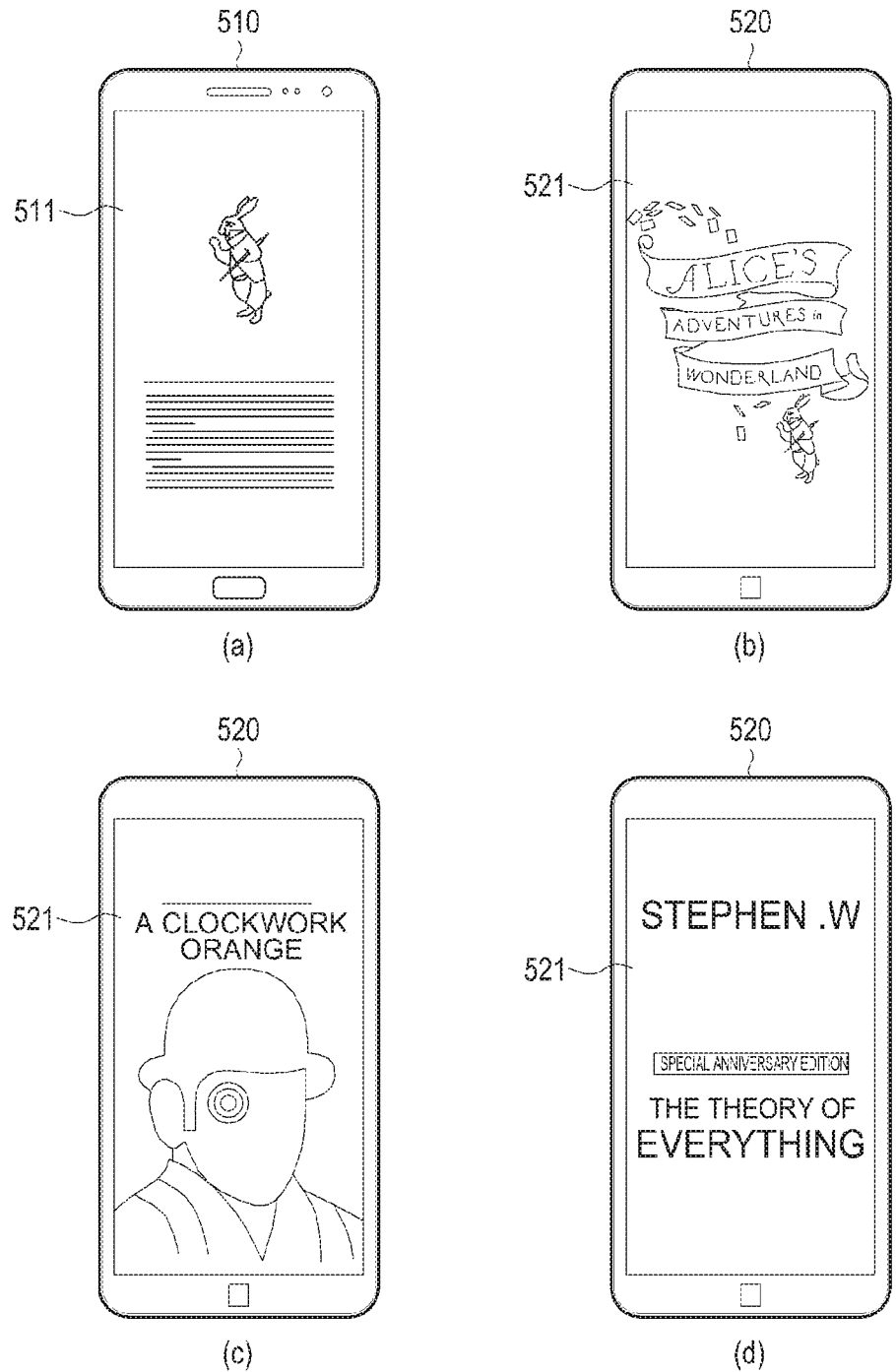

Referring to FIG. 9A, the electronic device 101 displays e-book content executed through an e-book viewer application on the first display 511 as shown in (a) of FIG. 9A. In this case, the electronic device 101 may display an image associated with the e-book content, for example, a cover image of the e-book content as shown in (b) of FIG. 9A, on the second display 521.

Similarly, as shown in (c) and (d) of FIG. 9A, the electronic device 101 may display a cover image corresponding to the e-book content displayed on the first display 511, on the second display 521. Although not shown, the electronic device 101 displays a separate image configured in the e-book content. Thus, an e-book content provider may configure the e-book content to display an image representing the e-book content.

Figure 9B:
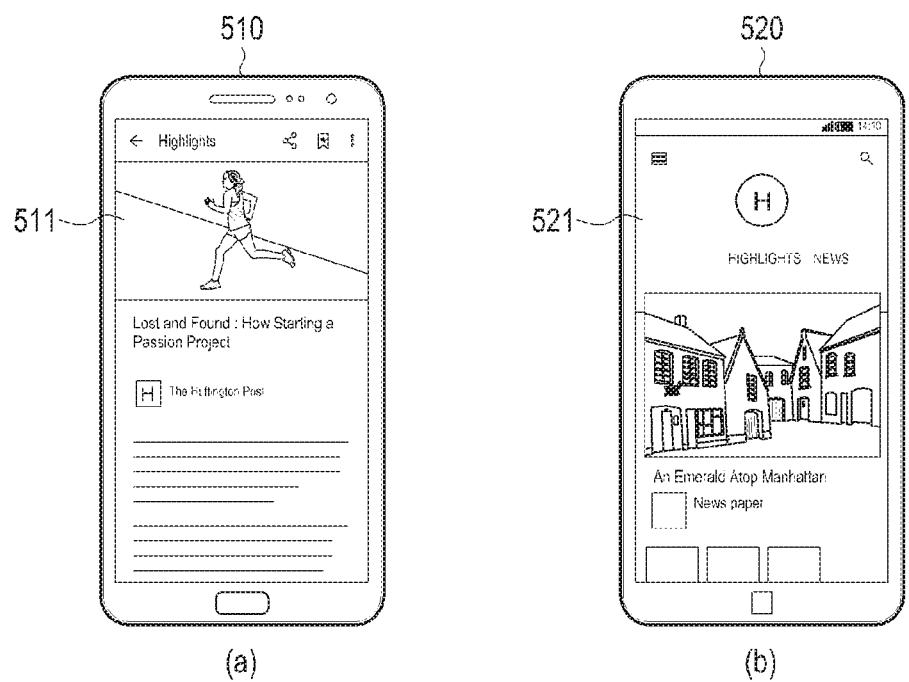

Referring to FIG. 9B, the electronic device 101 displays a web page providing a news accessed through a web browser application on the first display 511 as shown in (a) of FIG. 9B. As shown in (b) of FIG. 9B, the electronic device 101 displays an image associated with the web page, for example, a web page displaying a headline new provided by a provider of the web page or a web page displaying a title of the provider. The provider of the web page may configure the web page to be provided on the second display 521, and the provider may also change the web page to be provided through the second display 521 in real time when the provides desires to do so.

Figure 9C:
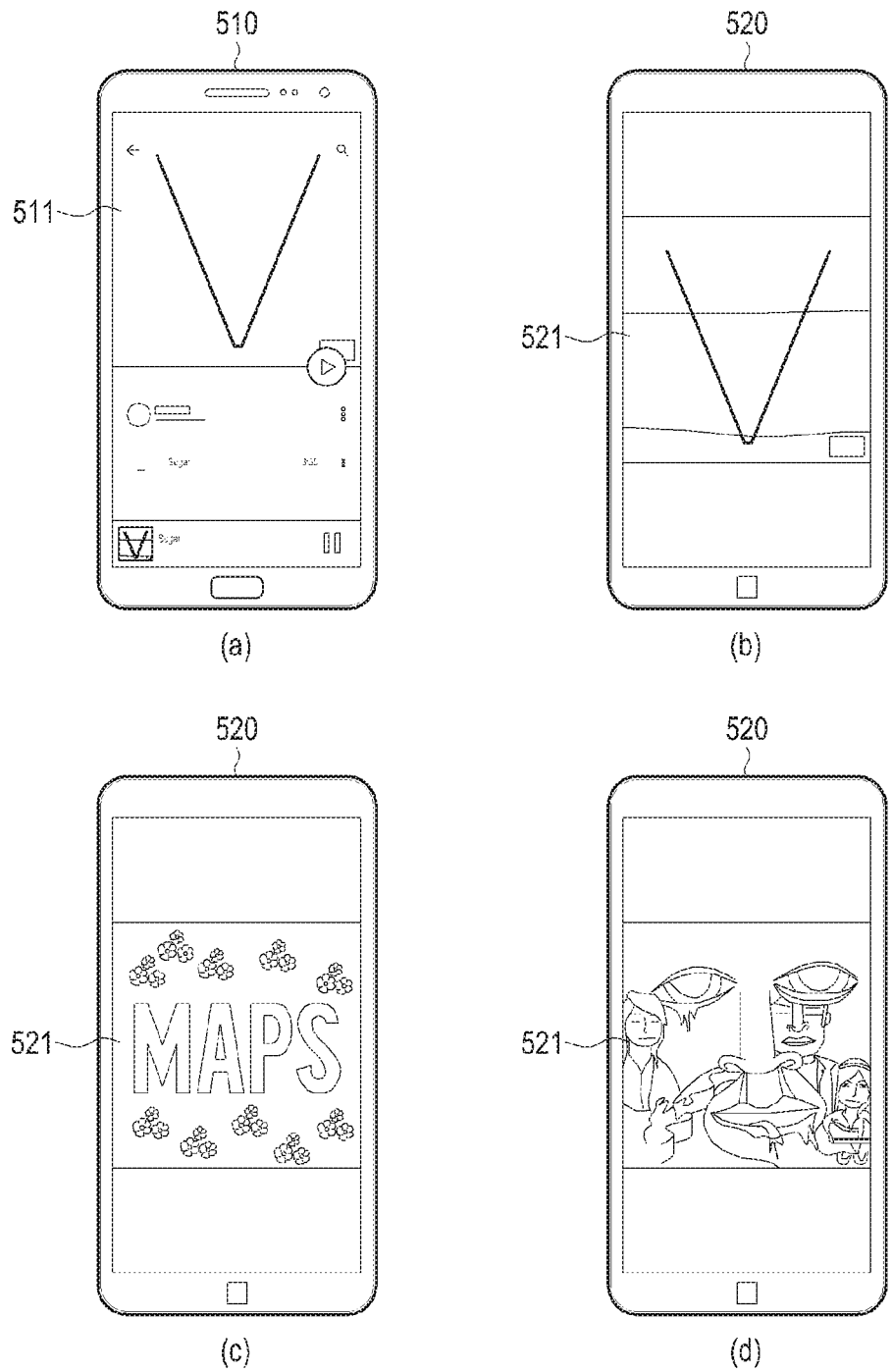

Referring to FIG. 9C, the electronic device 101 reproduces music content through a first media player application and displays a screen in which the music content is reproduced on the first display 511 as shown in (a) of FIG. 9C. In this case, the electronic device 101 may display an image associated with the reproduced music content, for example, a cover image of a music album including the music content, an image representing the music album, an image pertaining to another music content related to the music content, and so forth, on the second display 521. The cover image of the music album, the image representing the music album, and so forth may be set by a provider of the music album in a plurality of music contents included in the music album.

Similarly, as shown in (c) and (d) of FIG. 9C, the electronic device 101 may display a cover image and a representative image of the music album corresponding to the music content displayed on the first display 511, on the second display 521.

Figure 9D:
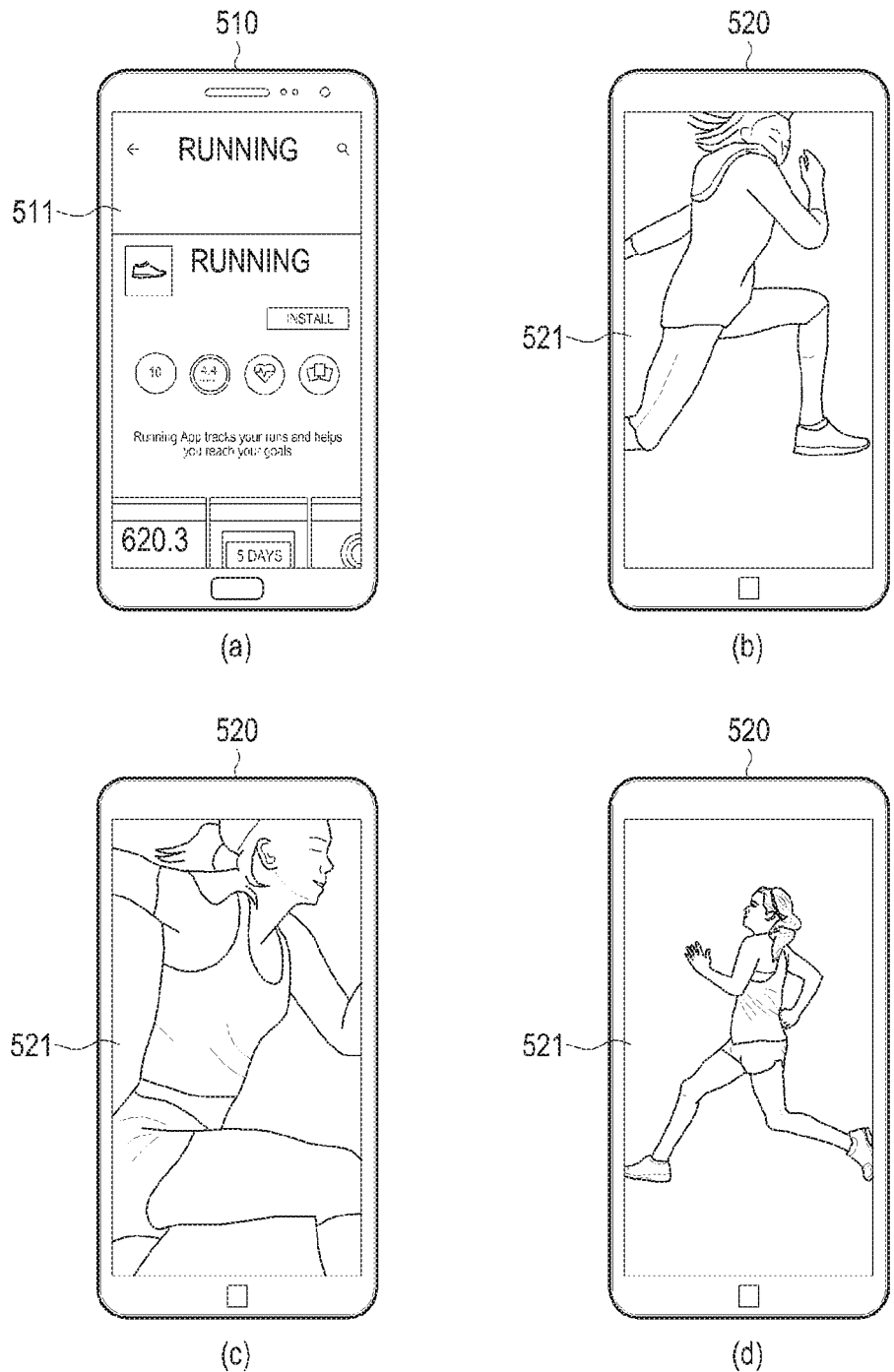

Referring to FIG. 9D, the electronic device 101 displays a screen for downloading the first application through an application-downloading application on the first display 511, as shown in (a) of FIG. 9D. In this case, the electronic device 101 displays an image associated with the first application on the second display 521 as shown in (b), (c), and (d) of FIG. 9D. The image associated with the first application may include an image representing the first application, an image associated with the provider of the first application, an advertisement image associated with the first application, and so forth, and the image displayed on the second display 521 may be set by the provider of the first application.

Referring to FIG. 9E, the electronic device 101 displays an execution screen of a game application on the first display 511, as shown in (a) of FIG. 9E. In this case, as shown in (b), (c), and (d) of FIG. 9E, the electronic device 101 may display an image associated with the game application, for example, an image representing the game application, an image associated with an event held by a provider of the game application, an image associated with a coupon provided by the provider of the game application, an image pertaining to an advertisement of the game application, an image pertaining to other game applications associated with the game application, and so forth. The image displayed on the second display 521 may be set by the provider of the game application.

Referring to FIG. 9F, the electronic device 101 reproduces movie content executed through a media player application and displays a screen in which the movie content is reproduced on the first display 511 as shown in (a) of FIG. 9F. In this case, as shown in (b), (c), and (d) of FIG. 9F, the electronic device 101 displays the image associated with the movie content, for example, a poster image of the movie content, a trailer image of the movie content, an advertisement image of the movie content, an image pertaining to another movie content associated with the movie content, and so forth on the second display 521. The image associated with the movie content may be set by a provider of the movie content.

Figure 9G:
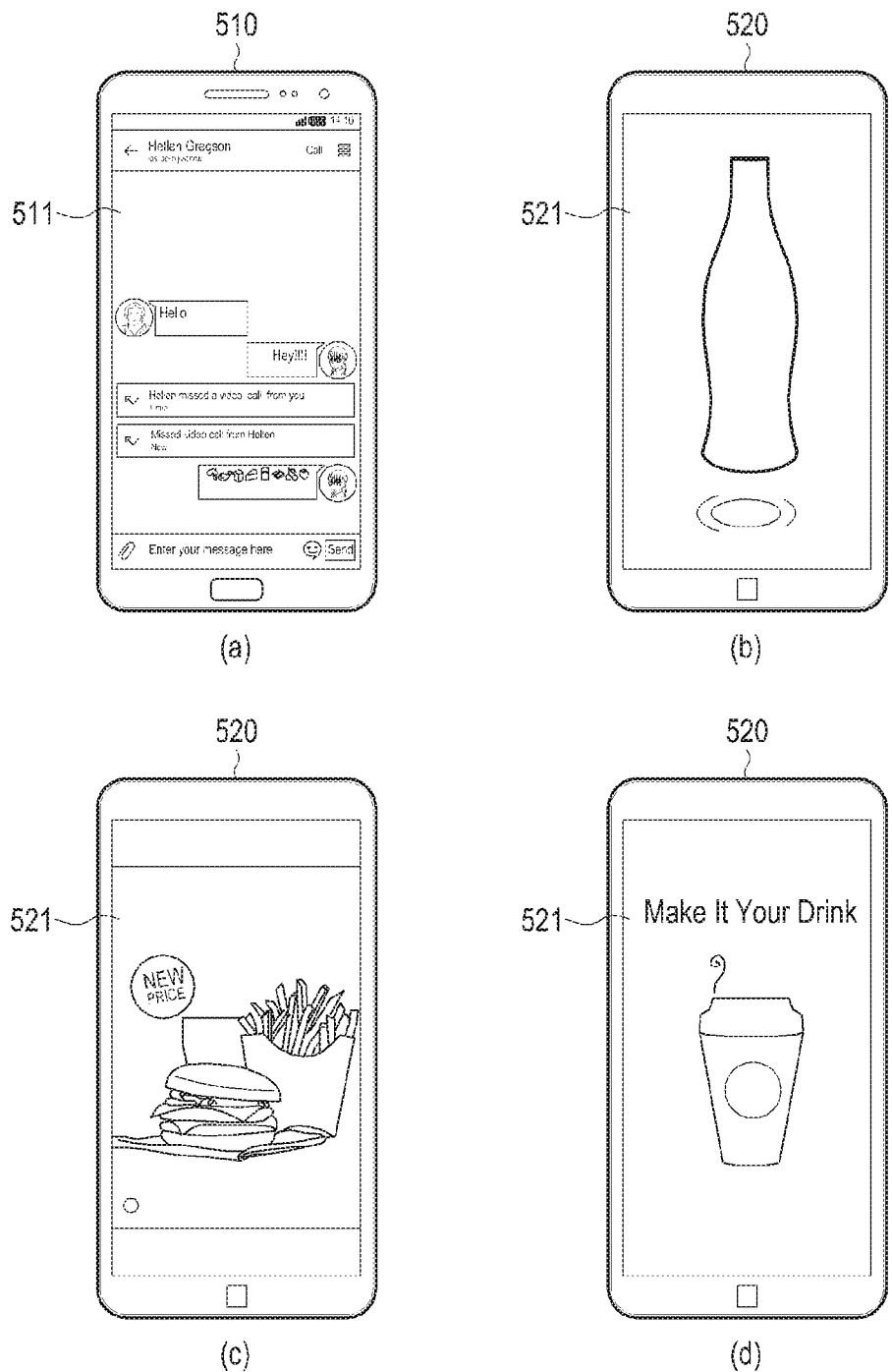

Referring to FIG. 9G, the electronic device 101 displays an execution screen of a messenger application on the first display 511, as shown in (a) of FIG. 9G. The electronic device 101 displays an image pertaining to an advertisement determined based on information obtained by the electronic device 101, regardless of a screen displayed on the first display 511. Although not shown, the electronic device 101 displays the image pertaining to the advertisement associated with the screen displayed on the first display 511, on the second display 521.

The information obtained through the electronic device 101 may include at least one of location information, time information, and weather information of the electronic device 101. As shown in (b) of FIG. 9G, the electronic device 101 displays an advertisement image based on the location information on the second display 521. For example, when the user of the electronic device 101 watches a sports game in a stadium, a drink advertisement image may be displayed on the second display 521 as shown in (b) of FIG. 9G.

As shown in (c) of FIG. 9G, the electronic device 101 displays an advertisement image based on the time information on the second display 521. For example, when the time information indicates a lunch time, the electronic device 101 may display a fast food advertisement image on the second display 521.

As shown in (d) of FIG. 9G, the electronic device 101 displays an advertisement image based on the weather information on the second display 521. For example, when the weather information indicates a rainy weather, the electronic device 101 may display an image pertaining to a drink advertisement that provides an event or a coupon on a rainy day on the second display 521.

The advertisement image provided on the second display 521 may be configured to be displayed when matching particular information among the information obtained through the electronic device 101 according to a need of an advertiser. In this way, as the advertisement image is displayed on the second display 521, the user of the electronic device 101 may transmit information indicating advertisement image providing to an external charging server and may be provided with benefits corresponding to advertisement image providing.

In this way, various types of images capable of representing user's taste, propensity, or application or content in use may be provided through the second display 521. Moreover, as described above, in a state where the angle between the first body portion 510 and the second body portion 520 is less than or equal to the preset angle, that is, the user of the electronic device 101 is not able to see the entire second display 521 or at least a region thereof, various types of images may be displayed on the second display 521. As such, the electronic device 101 may display an image the user of the electronic device 101, a provider of an application, or a provider of content desires to show to other users on the second display 521.

FIG. 10 is a view for describing a process of changing a direction in which a display included in an electronic device is oriented, according to various embodiments of the present disclosure.

With reference to FIG. 10, a process of flipping the electronic device 101 by the user will be described. As shown in (a) of FIG. 10, the user may see a screen of the first application displayed on the first display 511 while holding the electronic device 101.

When the user desires to check a screen displayed on the second display 521 while seeing the screen of the first application displayed on the first display 511, the user may rotate the electronic device 101 instead of completely flipping the electronic device 101 as shown in (b) of FIG. 10. In this case, the electronic device 101 senses whether the change of the direction of the electronic device 101 based on the direction information obtained through the sensor. Once the electronic device 101 senses the change of the direction of the electronic device 101, the electronic device 101 determines the third direction in which the first display 511 is oriented as shown in (b) of FIG. 10 and which is changed from the first direction due to the change of the direction of the electronic device 101 as shown in (a) of FIG. 10. The electronic device 101 also determines the angle between the first direction and the third direction and determines based on the determined angle whether the electronic device 101 is completely flipped or is rotated instead of being completely flipped.

For example, when the determined angle is greater than or equal to the first threshold value and is less than the second threshold value, the electronic device 101 may determine that the electronic device 101 is rotated instead of being completely flipped, and if the determined angle is greater than or equal to the second threshold value, the electronic device 101 may determine that the electronic device 101 is completely flipped as shown in (c) of FIG. 10.

The first threshold value may be set based on a magnitude of an angle at which the user is able to see the second display. In addition, the second threshold value may be set based on a magnitude of an angle for determining whether the electronic device 101 is flipped.

When determining that the electronic device 101 is rotated instead of being completely flipped, the electronic device 101 may simultaneously display an image displayed on the second display 521 and information associated with the first application or the first content executed through the first application on the second display 521.

When determining that the electronic device 101 is completely flipped, the electronic device 101 displays information associated with the first application or the first content on the second display.

According to various embodiments of the present disclosure, the electronic device 101 determines a type in which the user holds the electronic device 101 through a sensor of the electronic device 101 and determines whether motion of the electronic device 101 is generated according to the determined holding type. The electronic device 101 may also determine based on the determined holding type whether the electronic device 101 is completely flipped.

For example, the electronic device 101 may detect, through the sensor, a display of the first display 511 and the second display 521 which a user's hand contacts or to which the user's hand is in proximity. The electronic device 101 may also identify an area of the detected display which the user's hand contacts or to which the user's hand is in proximity.

The electronic device 101 determines that motion of the electronic device 101 is generated when the display which the user's hand contacts or to which the user's hand is in proximity is changed or the identified area which the user's hand contacts or to which the user's hand is in proximity is changed, and determines whether the electronic device 101 is flipped based on the changed display which the user's hand contacts or to which the user's hand is in proximity or the changed area which the user's hand contacts or to which the user's hand is in proximity.

FIGS. 11A through 11D illustrate a screen displayed on each of a plurality of displays when an electronic device according to various embodiments of the present disclosure is flipped.

Figure 11A:
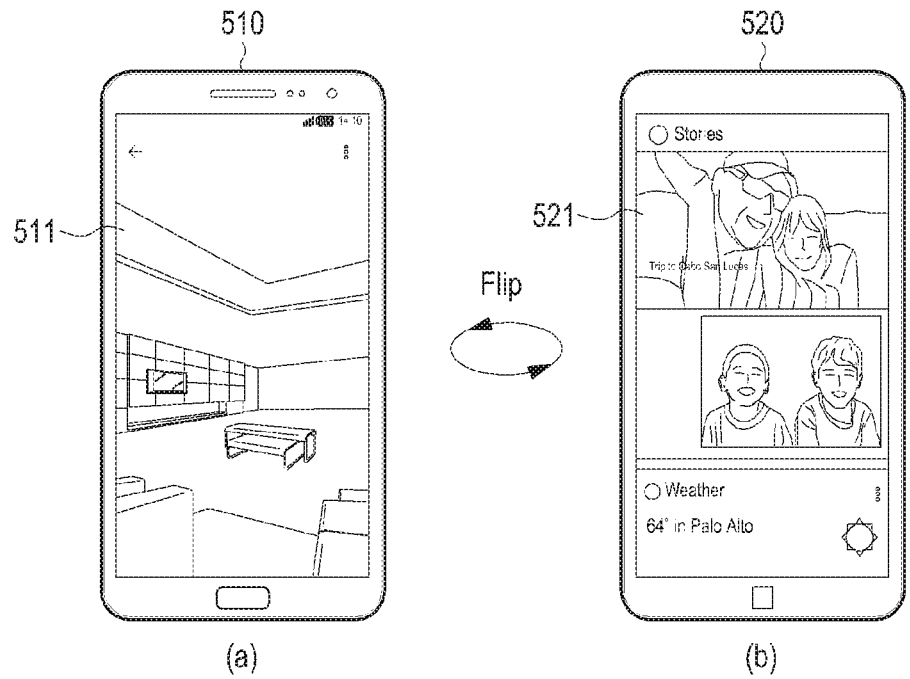
FIGS. 11A through 11D illustrate a screen displayed on each of a plurality of displays when an electronic device according to various embodiments of the present disclosure is flipped.

Referring to FIG. 11A, the electronic device 101 displays image content through an image viewer application on the first display 511 as shown in (a) of FIG. 11A. In this case, when determining that the electronic device 101 is flipped, the electronic device 101 displays information associated with the image content on the second display 521.

For example, other image contents associated with the image content, image contents indicating a result of carrying out a search through the image content, a web page corresponding to the image content, and so forth may be displayed on the second display 521.

Figure 11B:
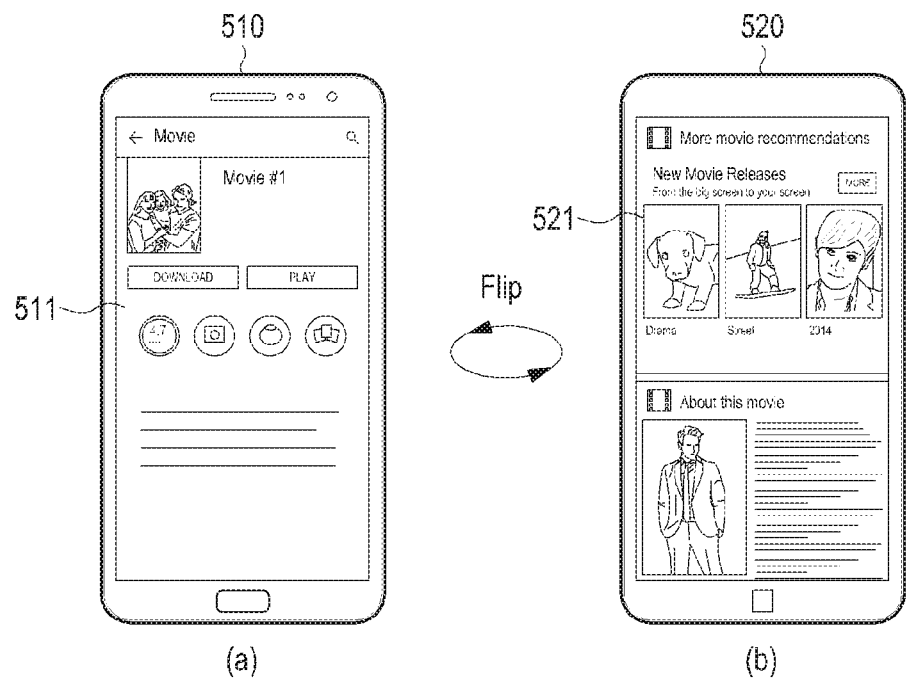

Referring to FIG. 11B, the electronic device 101 displays a screen for downloading a first moving image through a moving-image-downloading application. In this case, when determining that the electronic device 101 is flipped, the electronic device 101 displays information associated with the first moving image on the second display 521.

For example, recommendation information regarding other moving images associated with the first moving image, information indicating a review of the first moving image, a story and characters of the first moving image, etc., may be displayed on the second display 521.

Figure 11C:
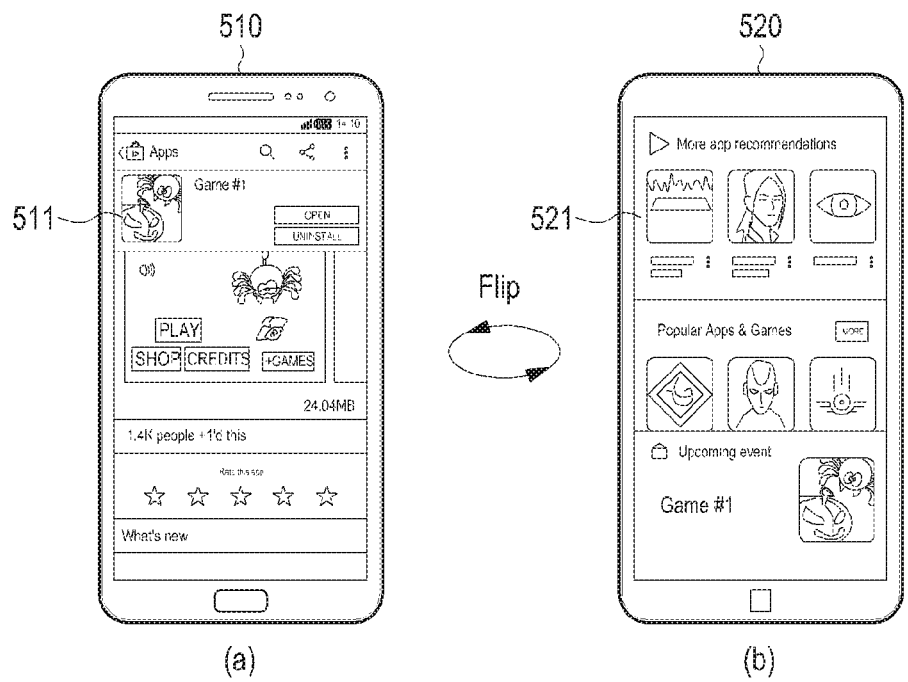

Referring to FIG. 11C, the electronic device 101 displays a screen for downloading the first application through the application-downloading application. In this case, when determining that the electronic device 101 is flipped, the electronic device 101 displays information associated with the first application on the second display 521.

For example, recommendation information regarding other moving applications associated with the first application, information indicating a review of the first application, the execution screen of the first application, etc., may be displayed on the second display 521.

Figure 11D:
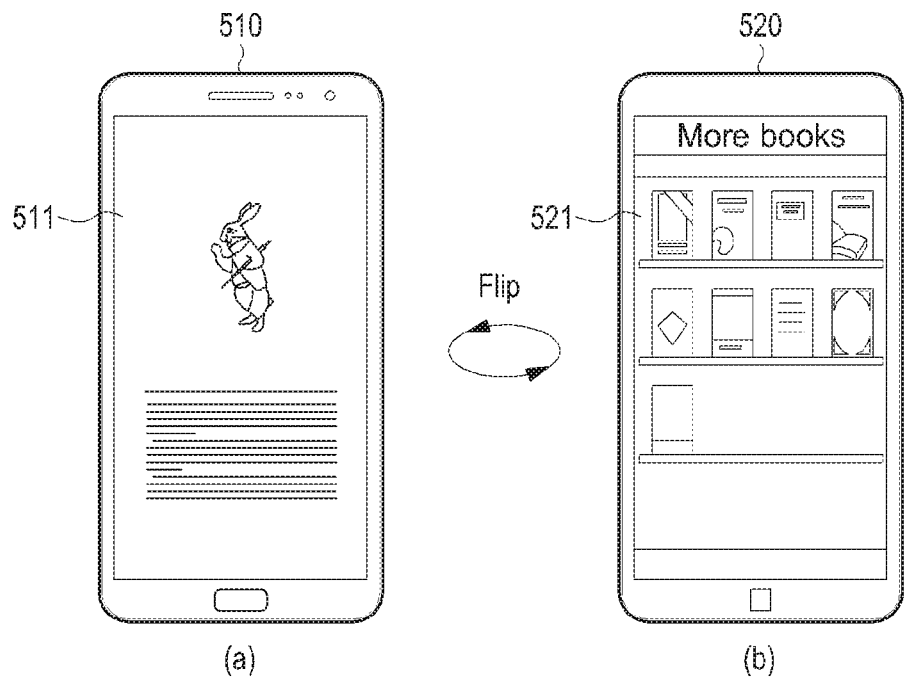

Referring to FIG. 11D, the electronic device 101 displays e-book content executed through the e-book viewer application. In this case, when determining that the electronic device 101 is flipped, the electronic device 101 displays information associated with the e-book content on the second display 521.

For example, recommendation information regarding other e-book contents associated with the e-book content, information indicating a review of the e-book content, information about a web site for buying the e-book contents, etc., may be displayed on the second display 521.

The above-described information displayed on the second display 521 is an example for description, and the present disclosure is not limited thereto, and various information associated with the first application or the first content executed through the first application may be displayed on the second display 521 as the electronic device 101 is flipped.

Figure 12A:
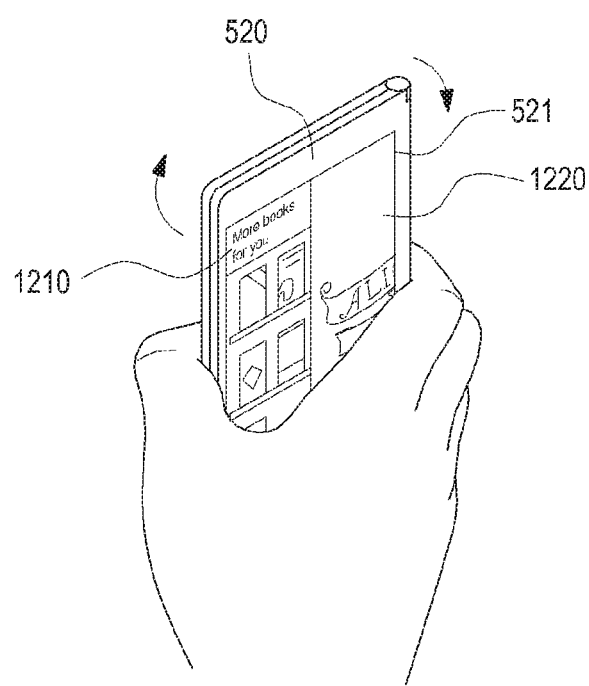
FIGS. 12A and 12B illustrate a screen displayed on one of a plurality of displays when an electronic device according to various embodiments of the present disclosure is not completely flipped.
Figure 12B:
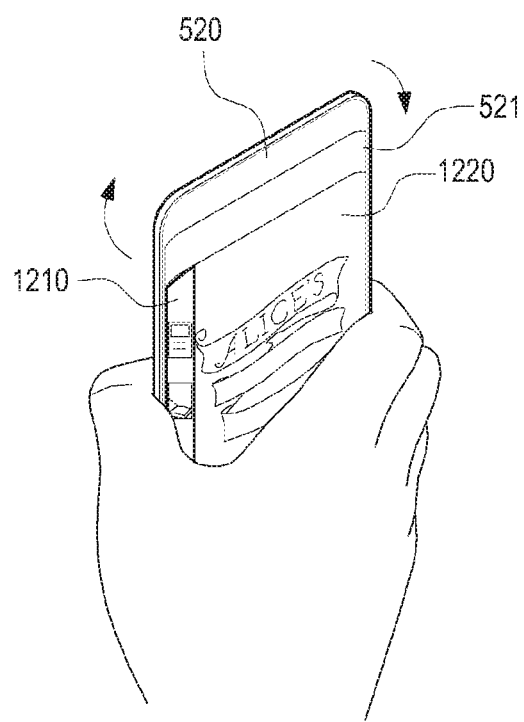

FIGS. 12A and 12B illustrate a screen displayed on one of a plurality of displays when an electronic device according to various embodiments of the present disclosure is not completely flipped.

The electronic device 101 displays e-book content executed through an e-book viewer application. In this case, when determining that the electronic device 101 is not flipped, the electronic device 101 displays an image associated with the e-book content, for example, a cover image of the e-book content, and information associated with the e-book content, for example, recommendation information of other e-book contents associated with the e-book content at the same time on the second display 521.

Thus, the electronic device 101 determines a size of a first region 1210 in which the information associated with the e-book content is displayed and a size of a second region 1220 in which the image associated with the e-book content is displayed, according to a rotation state of the electronic device 101 on the second display 521.

Referring to FIG. 12A, the electronic device 101 determines the size of the first region 1210 and the size of the second region 1220 as being equal to each other according to the rotation state of the electronic device 101, and displays the information associated with the e-book content and the image associated with the e-book content.

Referring to FIG. 12B, when the electronic device 101 is less rotated than in FIG. 12A, the electronic device 101 may determine the size of the first region 1210 as being smaller than that of the second region 1220 and display the information associated with the e-book content and the image associated with the e-book content on the second display 521.

The electronic device 101 may determine the size of the first region 1210 and the second region 1220 such that the image associated with the e-book content is naturally switched into the information associated with the e-book content as the electronic device 101 is rotated.

Figure 13C:
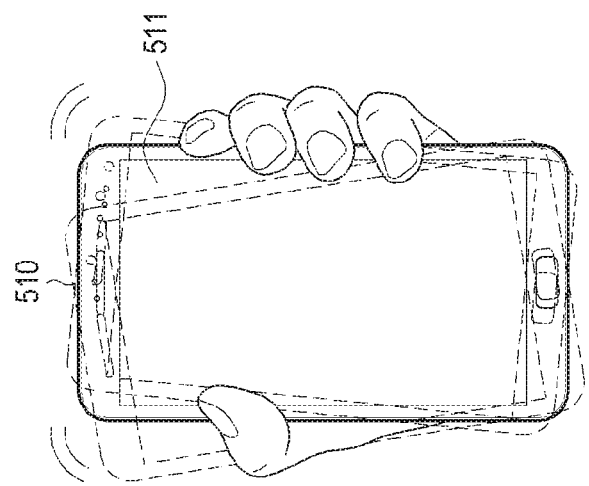
FIGS. 13A through 13C illustrate various views of a form of an additional input received from a user according to various embodiments of the present disclosure.
Figure 13B:
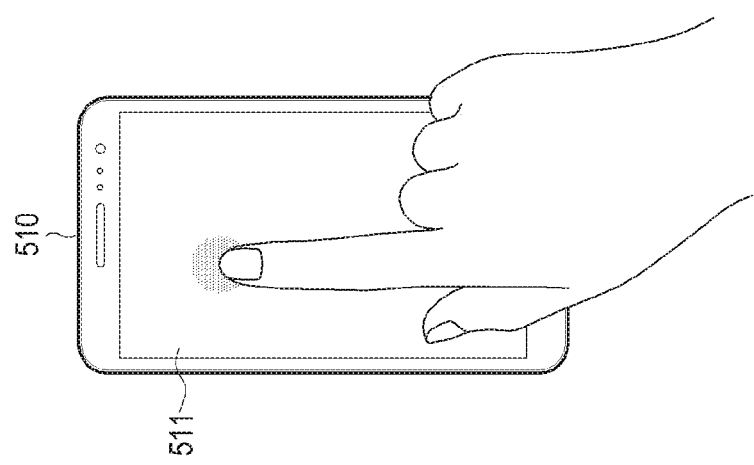
Figure 13A:
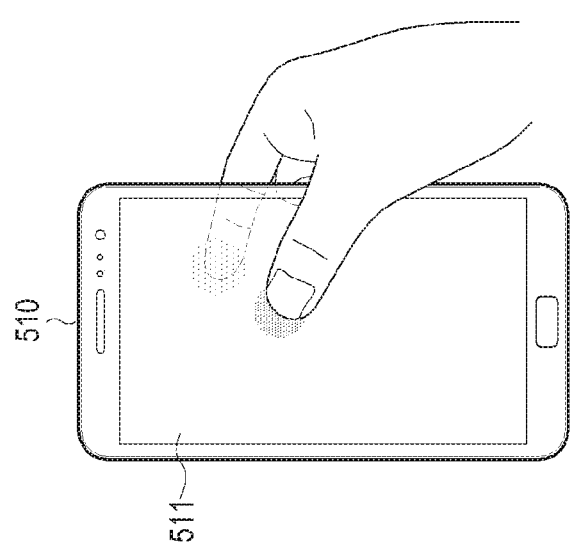

FIG. 13 illustrates a form of an additional input received from a user according to various embodiments of the present disclosure.

According to various embodiments of the present disclosure, once sensing the change of the direction of the electronic device 101 within a preset time after reception of an additional input of the user, the electronic device 101 determines the third direction in which the first display is oriented and which is changed from the first direction due to the direction change of the electronic device 101.

Referring to (a) of FIG. 13, the additional input may be a touch input to touch both the first display 511 and the second display 521. Referring to (b) of FIG. 13, the additional input may be a touch input to touch only the first display 511. Referring to (c) of FIG. 13, the additional input may be an input made through motion of the electronic device 101, for example, an input made by shaking of the electronic device 101.

Although not shown, various inputs that may be made through an input means of the electronic device 101 may be used as the additional input according to user's setting or the like.

Each of the foregoing elements described herein may be configured with one or more components, names of which may vary with a type of the electronic device. In various embodiments, the electronic device may include at least one of the foregoing elements, some of which may be omitted or to which other elements may be added. In addition, some of the elements of the electronic device according to various embodiments may be integrated into one entity to perform functions of the corresponding elements in the same manner as before they are integrated.

A term "module" used herein may mean, for example, a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or part thereof, adapted to perform one or more functions. The "module" may be implemented mechanically or electronically. For example, the "module" according to the embodiments may include at least one of an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with instructions stored in a computer-readable storage medium in the form of a programming module. When the instructions are executed by one or more processors (for example, the processor 120), the one or more processors may perform functions corresponding to the instructions. The computer-readable storage medium may be, for example, a memory included in the memory 130.

The computer readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), a hardware device (e.g., ROM, RAM, flash memory, etc.), and so forth. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner. Also, some of the operations may be executed in different order or omitted or may have additional different operations.

According to various embodiments, a storage medium has stored therein instructions for, when executed by at least one processor, causing the at least one processor to perform at least one operation including displaying a screen of a first application on a first display and displaying at least one of an image associated with the first application, an image associated with first content executed through the first application, or an image associated with information obtained through the electronic device, on the second display at a preset angle or less between a first body portion and a second body portion that are included in the electronic device.

The embodiments disclosed herein have been provided for description and understanding of disclosed technical matters and are not intended to limit the scope of the present disclosure. Therefore, it should be construed that the scope of the present disclosure includes any change or other various embodiments based on the technical spirit of the present disclosure.

The invention claimed is:

1. An electronic device comprising:
a first body portion;
a second body portion hinge-coupled with the first body portion, such that the first body portion and the second body portion pivot with respect to each other;
a first display arranged on a first surface of the first body portion and oriented in a first direction;
a second display arranged on a second surface of the second body portion and oriented in a second direction; and
a processor configured to:
display, on the first display, a first screen corresponding to an execution screen of a first application,
display, on the second display, a second screen including at least one of a first image associated with the first application, a second image associated with first content executed through the first application, or a third image associated with information obtained through the electronic device, in a state where the first body portion and the second body portion are arranged such that the first display and the second display face in opposite directions,
in response to detecting that an orientation direction of the electronic device is changed according to a flip of the electronic device while holding the electronic device in a hand of a user, in the state where the first body portion and the second body portion are arranged such that the first display and the second display face in opposite directions, display, on the second display, at least one image determined based on an angle value changed with respect to the first direction of the first display according to the flip, wherein the at least one image includes at least part of an image corresponding to the first screen or an image corresponding to the second screen, and
display, on the second display, when the angle value is greater than or equal to a first threshold value and less than a second threshold value which is greater than the first threshold value, a part of the image corresponding to the first screen and a part of the image corresponding to the second screen.

2. The electronic device of claim 1, wherein the processor is further configured to determine whether to operate the second display according to the first application or the first content executed through the first application.

3. The electronic device of claim 2, wherein the processor is further configured to display at least one of the first image associated with the first application, the second image associated with the first content executed through the first application or the third image associated with the information obtained through the electronic device on the second display, when the processor determines to operate the second display.

4. The electronic device of claim 1, wherein,
when the second screen configured to be displayed on the second display includes the first image associated with the first application or the second image associated with the first content executed through the first application, the second screen comprises at least one of an image provided by a provider of the first application or the first content, an image configured in the first application or the first content, an image pertaining to second content or a second application associated with the first application or the first content; or when the second screen configured to be displayed on the second display includes the third image associated with information obtained through the electronic device, the second screen comprises an image pertaining to an advertisement determined based on information obtained by the electronic device.

5. The electronic device of claim 1, wherein, when the processor is configured to display the first screen of the first application on the first display and to display the second screen including the third image associated with information obtained through the electronic device on the second display, the information obtained through the electronic device comprises at least one of location information, time information, and weather information of the electronic device.

6. The electronic device of claim 1, further comprising a sensor configured to obtain direction information of the electronic device.

7. The electronic device of claim 6, wherein the processor is further configured to:
   determine a change of a direction of the electronic device based on the direction information obtained by the sensor, and
   determine a third direction in which the first display is oriented, the third direction being changed from the first direction due to the change of the direction of the electronic device.

8. The electronic device of claim 7, wherein the processor is further configured to determine an angle between the first direction and the third direction based on a result of the determination of the third direction.

9. The electronic device of claim 8, wherein when the determined angle is greater than or equal to a first threshold value and is less than the second threshold value, the processor is further configured to display further information associated with the first application or the first content on the second display, together with at least part of the second screen displayed on the second display, at a same time.

10. The electronic device of claim 9, wherein the processor is further configured to determine a size of a first region where the associated image is displayed on the second display and a size of a second region where the information associated with the first application or the first content is displayed, depending on a magnitude of the determined angle.

11. The electronic device of claim 8, wherein the processor is further configured to display the information associated with the first application or the first content on the second display, when the determined angle is greater than or equal to the second threshold value.

12. The electronic device of claim 7, wherein the processor is further configured to determine a third direction in which the first display is oriented, the third direction being changed from the first direction due to a change of a direction of the electronic device, when the processor senses the change of the direction of the electronic device within a preset time after reception of a preset additional input from a user.

13. The electronic device of claim 12, wherein the preset additional input comprises at least one of an input to touch at least one of the first display and the second display, a voice input corresponding to a preset voice, a gesture input corresponding to a preset gesture pattern, an input made through a motion of the electronic device corresponding to a preset pattern, or an input made through a function key of the electronic device.

14. An operation method of an electronic device that comprises a first body portion, a second body portion hinge-coupled with the first body portion, such that the first body portion and the second body portion pivot with respect to each other, a first display arranged on a first surface of the first body portion and oriented in a first direction, a second display arranged on a second surface of the second body portion and oriented in a second direction, and a sensor configured to obtain direction information of the electronic device, the operation method comprising:
   displaying, on the first display, a first screen corresponding to an execution screen of a first application;
   displaying, on the second display, a second screen including at least one of a first image associated with the first application, a second image associated with first content executed through the first application, or a third image associated with information obtained through the electronic device, in a state where the first body portion and the second body portion are arranged such that the first display and the second display face in opposite directions; and
   in response to detecting that an orientation direction of the electronic device is changed according to a flip of the electronic device while holding the electronic device in a hand of a user, in the state where the first body portion and the second body portion are arranged such that the first display and the second display face in opposite directions, displaying, on the second display, at least one image determined based on an angle value changed with respect to the first direction of the first display according to the flip, wherein the at least one image includes at least part of an image corresponding to the first screen or an image corresponding to the second screen,
   wherein displaying the at least one image includes when the angle value is greater than or equal to a first threshold value and less than a second threshold value which is greater than the first threshold value, displaying, on the second display, a part of the image corresponding to the first screen and a part of the image corresponding to the second screen.

15. The operation method of claim 14, further comprising determining whether to operate the second display according to the first application or the first content executed through the first application.

16. The electronic device of claim 1, wherein, when an angle between the first body portion and the second body portion is less than a preset angle, the first direction is towards a user and the second direction is away from the user.

17. The electronic device of claim 1, wherein the first direction and the second direction do not intersect.

18. The method of claim 14, wherein, when an angle between the first body portion and the second body portion is less than a preset angle, the first direction is towards a user and the second direction is away from the user.

19. The method of claim 14, wherein the first direction and the second direction do not intersect.

20. The electronic device of claim 8, wherein when the determined angle is equal to 180 degrees, the processor is further configured to turn off at least one of the first display or the second display.

* * * * *